(12) United States Patent
Ogiwara et al.

(10) Patent No.: US 8,286,427 B2
(45) Date of Patent: Oct. 16, 2012

(54) MASTER CYLINDER

(75) Inventors: Takato Ogiwara, Minami-ALPS (JP);
Takayuki Kinoshita, Minami-ALPS (JP)

(73) Assignee: Hitachi, Ltd., Tokyo (JP)

( * ) Notice: Subject to any disclaimer, the term of this patent is extended or adjusted under 35 U.S.C. 154(b) by 1055 days.

(21) Appl. No.: 12/219,673

(22) Filed: Jul. 25, 2008

(65) Prior Publication Data

US 2009/0025385 A1 Jan. 29, 2009

(30) Foreign Application Priority Data

Jul. 27, 2007 (JP) ................................ 2007-195745
Jul. 31, 2007 (JP) ................................ 2007-200185
Jul. 31, 2007 (JP) ................................ 2007-200186

(51) Int. Cl.
*F15B 7/08* (2006.01)
(52) U.S. Cl. ......................................... 60/591; 60/588
(58) Field of Classification Search .................... 60/585, 60/588, 591
See application file for complete search history.

(56) References Cited

U.S. PATENT DOCUMENTS 6,141,963 A * 11/2000 Gotoh et al. .................... 60/591
7,694,517 B2 * 4/2010 Ogiwara et al. ................ 60/591
7,841,178 B2 * 11/2010 Mouri et al. .................... 60/588

FOREIGN PATENT DOCUMENTS

| JP | 12-10176 | 7/1937 |
|---|---|---|
| JP | 3-20770 | 2/1991 |
| JP | 6-10670 | 2/1994 |
| JP | 6-10671 | 2/1994 |
| JP | 6-49868 | 7/1994 |
| JP | 9-119553 | 5/1997 |
| JP | 9-210219 | 8/1997 |
| JP | 11-268629 | 10/1999 |
| JP | 2003-42329 | 2/2003 |

OTHER PUBLICATIONS

Japanese Office Action (with English translation) issued Apr. 5, 2011 in corresponding Japanese Patent Application No. 2007-200185.
Japanese Office Action (with English translation) issued Apr. 5, 2011 in corresponding Japanese Patent Application No. 2007-200186.

* cited by examiner

*Primary Examiner* — Michael Leslie
(74) *Attorney, Agent, or Firm* — Wenderoth, Lind & Ponack, LLP

(57) ABSTRACT

In a master cylinder, a supply passage for supplying operating liquid from a reservoir (2) to a pressure chamber (6) is provided in a cylinder body (3) coupled with the reservoir. A bypass passage (37) for bypassing the supply passage and connecting the reservoir and the pressure chamber is further provided, and a check valve (34) adapted to open when a pressure in the pressure chamber is lower than that in the reservoir is disposed in the bypass passage. A valve case (38) containing a valve body (41) of the check valve includes a valve seat (40) and a cylindrical wall (45) for slidably guiding the valve body which are integrally formed as a single member.

24 Claims, 14 Drawing Sheets

MASTER CYLINDER

BACKGROUND OF THE INVENTION

1. Technical Field

The present invention relates to a master cylinder used in a brake system of a motor vehicle or the like.

In a master cylinder, a piston is slidably fitted in a cylinder body to which operating fluid is introduced from a reservoir, and the cylinder body defines therein a pressure chamber in which the operating fluid is pressurized according to an operation of the piston. The pressure chamber is connected via a pipe to a hydraulic device of a brake system or the like, such that the hydraulic device is operated according to an operation of the piston. The cylinder body is provided with a supply passage for supplying the operating fluid from the reservoir to the pressure chamber, so as to prevent a pressure in the pressure chamber from becoming negative during an operation of returning the piston or the like.

2. Description of the Related Art

In recent years, development has been in progress for traction control systems for automatically applying brake forces to wheels according to vehicle wheel slip conditions. In such a system, a control pump, which is a part of a hydraulic device, sucks operating fluid from a pressure chamber in a master cylinder and supplies the sucked operating fluid to a wheel brake unit during a traction control. During this operation, in the master cylinder, an amount of operating fluid corresponding to the amount of operating fluid sucked from the pressure chamber is supplied from the reservoir via the supply passage to the pressure chamber. However, the supply of operating fluid is likely to be insufficient when the control pump sucks a large amount of operating fluid.

Conventionally, known master cylinders directed to this problem have a structure adapted to open a separate passage connecting the reservoir and the pressure chamber when the pressure chamber does not contain enough operating fluid (refer, for example, to Japanese Patent Application Public Disclosure No. HEI 11-268629).

Such a master cylinder comprises in a cylinder body thereof a bypass passage for bypassing a supply passage and connecting a reservoir and a pressure chamber. The bypass passage is provided therein with a check valve that is adapted to open when the pressure in the pressure chamber becomes lower than that in the reservoir. The check valve comprises a valve seat member having a valve hole, a valve body adapted to be seated on and move away from a valve seat of the valve seat member, and an urging spring for urging the valve body toward the valve seat. These members are disposed in a valve chamber formed in the bypass passage.

In this conventional master cylinder, however, the valve seat member is fixedly disposed in a valve containing hole, and the valve seat on which the valve body is seated, and a guide portion for slidably guiding the valve body are formed as separate bodies, whereby it is difficult to improve precision with which valve body is seated on the valve seat.

Therefore, an object of the present invention is to make it possible to easily improve precision with which the valve body is seated on the valve seat of the check valve, and provide a master cylinder which can be easily manufactured and in which high precision is realized.

SUMMARY OF THE INVENTION

To achieve the forgoing and other objects, an aspect of the present invention is a master cylinder, comprising: a cylinder body including a pressure chamber, into which an operating liquid is introduced from a reservoir; a supply passage for supplying the operating liquid from the reservoir to the pressure chamber; a piston slidably fitted in the cylinder body to define the pressure chamber, the piston adapted to open or close the supply passage according to a sliding position thereof; and a bypass passage for bypassing the supply passage to connect the reservoir and the pressure chamber, the bypass passage including a check valve adapted to open to allow a flow of the operating liquid from the reservoir to the pressure chamber when a pressure in the pressure chamber is lower than that in the reservoir, the check valve comprising a lift valve in which a valve body is seated on or moves away from a valve seat, the valve body of the lift valve being disposed in a valve case including the valve seat and a guide portion for slidably guiding the valve body which are formed as a single member.

The valve body may include a sliding portion which slides relative to the guide portion, and a valve portion which is disposed at one side of the sliding portion in a sliding direction and is seated on or moves away from the valve seat. The valve body may be urged toward the valve seat by an urging means.

The sliding portion of the valve body may have a circular outer circumference, and a length of the sliding portion in the sliding direction may be set to be longer than a diameter of the sliding portion.

A length of the guide portion in the sliding direction may be set to be longer than the length of the sliding portion of the valve body in the sliding direction which is guided by the guide portion.

The valve portion of the valve body may comprise a valve-portion body formed integrally with the sliding portion, and a rubber valve seal attached to the valve-portion body and adapted to be seated on or move away from the valve seat.

When the valve seal is compressed in the sliding direction of the valve body by a pressure equal to or larger than a predetermined pressure, the valve-portion body may abut against the valve seat.

Another aspect of the present invention is a master cylinder, comprising: a cylinder body which supplies to an outside a pressurized operating liquid generated in a pressure chamber in the cylinder body; a supply passage formed in the cylinder body for supplying to the pressure chamber the operating liquid and reserved in a reservoir; a bypass passage for bypassing the supply passage to connect the reservoir and the pressure chamber; and a check valve disposed in the bypass passage and allowing supply of the operating liquid only from the reservoir to the pressure chamber, wherein the bypass passage includes a valve chamber in which the check valve is disposed, a reservoir passage for connecting the valve chamber and the reservoir, and a pressure-chamber passage for connecting the valve chamber and the pressure chamber; the check valve is a lift valve in which a valve body is seated on and moves away from a valve seat; the valve body of the lift valve is slidably disposed in a valve case contained in the valve chamber; and the valve case includes the valve seat which is connected to the reservoir passage and which the valve body is seated on or moves away from, and a guide portion for slidably guiding the valve body, the valve seat and the guide portion being formed as a single member.

The valve case may include a cylindrical portion and a valve seat portion perpendicularly to the cylindrical portion. An inner surface of the cylindrical portion may serve as a guide portion.

The valve seat portion may be in communication with the reservoir passage, and a radially extending hole in communication with the pressure-chamber passage may be formed through a side wall of the cylindrical portion.

The radially extending hole may be positioned in an area of the side wall of the cylindrical portion where the valve body does not slide when the valve body operates.

A sliding portion of the valve body, which is guided by the guide portion, may comprise two flanges spaced apart from each other in a sliding direction.

A passage for allowing a flow of the operating liquid may be formed at the flange.

The valve case may be disposed in the valve chamber so that the valve body moves in a direction of gravity.

An upper end of the valve chamber may be located at a gravitationally lower position than the reservoir. The bypass passage connecting the valve chamber and the reservoir may be connected to the upper end of the valve chamber.

Still another aspect of the present invention is a master cylinder, comprising: a cylinder body into which an operating liquid is introduced from a reservoir; a piston slidably fitted in the cylinder body to define a pressure chamber in the cylinder body; a supply passage which is formed in the cylinder body and supplies the operating liquid from the reservoir to the pressure chamber; a bypass passage for bypassing the supply passage to connect the reservoir and the pressure chamber; and a check valve which is disposed in the bypass passage and opens when a pressure in the pressure chamber is lower than that in the reservoir, wherein the bypass passage includes a valve chamber in which the check valve is disposed, and connects the valve chamber to the reservoir and the pressure chamber; the check valve is a lift valve in which a valve body is seated on or moves away from a valve seat, and the valve body of the lift valve is slidably disposed in a valve case contained in the valve chamber; the valve case comprises a cylindrical portion, and a valve seat portion including a surface perpendicular to the axis of the cylindrical portion, the cylindrical portion and the valve seat portion being formed as a single member; the valve seat portion comprises a communication passage connected to the reservoir, and the valve seat comprising the surface which the valve body is seated on or moves away from; a guide portion for slidably guiding a sliding portion of the valve body is formed on an inner surface of the cylindrical portion; and the valve case is fixed to the cylinder body by a covering member for closing the valve chamber.

A radially extending hole in communication with the pressure chamber may be formed through a side wall of the cylindrical portion.

The radially extending hole may be positioned in an area on the valve seat side of the guide portion where the sliding portion of the valve body does not slide.

A valve portion of the valve body, which is adapted to be seated on and move away from the valve seat, may comprise a valve-portion body formed integrally with the sliding portion, and a rubber valve seal attached to the valve-portion body and adapted to be seated on or move away from the valve seat. The lift valve may be urged toward the valve seat by an urging means.

The valve-portion body may abut against the valve seat when the valve seal is compressed in a sliding direction of the valve body by a pressure equal to or larger than a predetermined pressure.

The sliding portion of the valve body may have a circular outer circumference, and a length of the sliding portion in the sliding direction may be set to be longer than a diameter of the sliding portion, and the sliding portion may comprise two flanges spaced apart from each other in the sliding direction.

The covering member may comprise a covering body for closing an open end of the valve chamber, and a screw member formed as an separate body from the covering body and screwed in the cylinder body.

The valve body may be made from a metal material containing aluminum, and may be urged toward the valve seat by the urging means.

Filters may be respectively disposed at the valve case for preventing entry of a foreign material from an upstream side and a downstream side of the check valve into the check valve.

One of the two filters may have a cylindrical shape, and may be disposed between the cover member and the cylinder body, around an outer surface of the valve case.

The other of the two filters may have a bottomed cylindrical shape, and may have an open end fixed to the valve case.

BRIEF DESCRIPTION OF THE DRAWINGS

FIG. 9(A) shows a containing portion having a maximum axial length, and FIG. 9(B) shows a containing portion having a minimum axial length.

DETAILED DESCRIPTION OF THE PREFERRED EMBODIMENT

Figure 1:
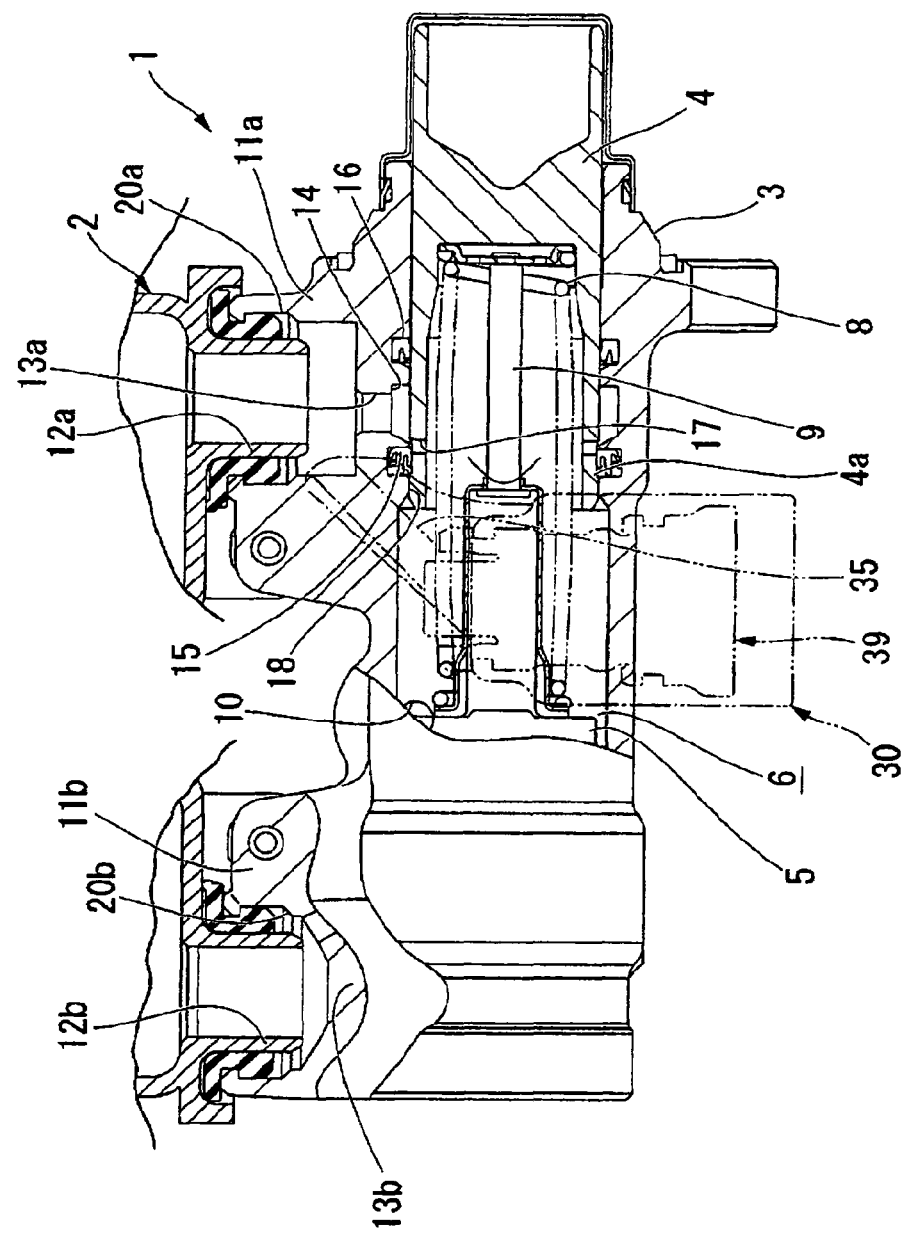
FIG. 1 is a partial cross-sectional side view of a master cylinder according to a first embodiment of the present invention.

Below, embodiments of the present invention will be described with reference to figures. In the embodiments described below, corresponding portions are denoted by same reference numerals and redundant descriptions will be omitted.

A first embodiment will be described with reference to FIGS. 1 to 11. In the figures, reference numeral 1 denotes a master cylinder of the present invention; and reference numeral 2 denotes a reservoir mounted above the master cylinder 1. The master cylinder 1 of the present embodiment is used in a vehicle brake system and adapted to supply operating fluid to a brake circuit in response to a brake operation from a driver's seat. The brake circuit is provided with a control pump (hydraulic device) (not shown) for traction control, such that operating fluid can be sucked into the control pump from the master cylinder 1 according to vehicle driving conditions, apart from a driver's brake operation.

As shown in FIG. 1, the master cylinder 1 is a tandem master cylinder having a primary piston 4 and a secondary piston 5 disposed in series in a cylinder body 3 having a bottomed cylindrical shape. The cylinder body 3 has two pressure chambers 6 (in FIG. 1, only a rear pressure chamber 6 is shown) defined by the pistons 4 and 5 therein. The pressure chambers 6 are connected via a supply/drain port 10 to different brake piping systems (for example, a front-wheel brake piping system and a rear-wheel brake piping system) of the vehicle.

The primary piston 4 is slidably fitted through an open side (the right side of FIG. 1) of the cylinder body 3. An end of the primary piston 4 located on the open side is connected via a booster (not shown) to an operating rod of a brake pedal. The secondary piston 5 is slidably fitted in a portion on a bottom side of the cylinder body 3, so as to define the pressure chamber 6 between the primary and secondary pistons 4 and 5, and define the other pressure chamber (not shown) between the secondary piston 5 and the bottom of the cylinder body 3. Each of pressure chambers 6 contains a return spring 8 for applying a reaction force to the primary piston 4 and the secondary piston 5 in a return direction. Each return spring 8 is integrally attached to a respective spring retainer 9 and disposed as a spring unit in each pressure chamber 6.

The cylinder body 3 is provided, on a top surface thereof, with bosses 11a and 11b for attachment of the reservoir 2, such that cylindrical supply/drain ports 12a and 12b (operating-fluid supply portions) of the reservoir 2 are connected to the respective bosses 11a and 11b. The bosses 11a and 11b have connection recesses 20a extending in a substantially perpendicular direction to an axial center of the cylinder body 3, so as to accommodate the supply/drain ports 12a and 12b of the reservoir 2.

On the other hand, the cylinder body 3 has an annular groove 14 at a potion of an inner surface of the cylinder body 3 where the primary piston 4 is fitted, such that the annular groove 14 and the connection recess 20a are connected by a communication hole 13a. Seal rings 15 and 16 are disposed at positions of the inner surface of the cylinder body 3 in front of and behind the annular groove 14 in the axial direction, so as to liquid-tightly seal the sliding clearance between the cylinder body 3 and the primary piston 4. Although omitted from FIG. 1, a similar annular groove is formed at a position of the inner surface of the cylinder body 3 where the secondary piston 5 is fitted, such that the annular groove and the connection recess 20b are connected by a communication hole 13b. Further, seal rings (not shown), which are similar to those disposed on the primary side, are disposed at positions in front of and behind the annular groove on the secondary side in the axial direction.

A conducting groove 18 connecting the annular groove 14 and the pressure chamber 6 is formed at a position on a front side of the annular groove 14 (the left side of FIG. 1) of the inner surface of the cylinder body 3. The conducting groove 18 is formed in the axial direction of the cylinder body 3, and the above-mentioned seal ring 15 is disposed at an intermediate position of a longitudinal dimension of the conducting groove 18. The seal ring 15 is formed so as to have an E-shaped cross-section and is disposed in the cylinder body 3 such that an open side of the cross section faces forward (the left side of FIG. 1), and such that an inner wall of the seal ring 15 is slidably in tight contact with the outer surface of the primary piston 4. Further, an outer wall of the seal ring 15 is flexibly deformed when the pressure in the front pressure chamber 6 becomes lower than that in the rear annular groove 14, so as to open the conducting groove 18, thereby allowing a supply of operating fluid from the annular groove 14 (reservoir 2) to the pressure chamber 6.

Further, the primary piston 4 has a cylindrical wall 4a facing the pressure chamber 6. The cylindrical wall 4a has return holes 17 formed radially therethrough. The return holes 17 connect the pressure chamber 6 and the annular groove 14 when the primary piston 4 is at an initial position, that is, at a rearmost position to which the primary piston 4 can move back, such that the pressure in the pressure chamber 6 and the brake circuit is maintained at an atmospheric pressure that is the same as that in the reservoir 2.

Although omitted from the figures, a structure having a conducting groove and return holes similar to that on the primary side, as described above, is also employed on the secondary side.

Therefore, when the pistons 4 and 5 are at their initial positions, the reservoir 2 and the pressure chambers 6 are connected through the communication holes 13a and 13b, annular grooves 14, and return holes 17 of the pistons 4 and 5, such that operating fluid is supplied from the reservoir 2 when the pressure chambers 6 do not have a sufficient amount of operating fluid due to operation of a traction control or the like. When the pistons 4 and 5 move forward from the initial positions such that the return holes 17 are displaced forward from the positions facing the annular grooves 14, communication between the reservoir 2 and the pressure chambers 6 is substantially shut by the seal rings 15. At this time, as the pistons 4 and 5 move forward, the pressures in the pressure chambers 6 increase to supply operating fluid to the brake circuits via the supply/drain ports 10.

When the pistons 4 and 5 in this state are moved back by forces of the return springs 8, the operating fluid in the brake circuits returns through the supply/drain ports 10 to the pressure chambers 6 and 7. When the pressures in the pressure chambers 6 temporarily become lower than the internal pressure in the reservoir 2 at this time, the outer walls of the seal rings 15 are deformed as described above, such that operating fluid is supplied from the reservoir 2 via the conducting grooves 18 to make up for shortages of operating fluid in the pressure chambers 6. In the present embodiment, the communication holes 13a and 13b, annular grooves 14, and return holes 17 of the cylinder body 3 constitute supply passages of the present invention. It should be noted that, in the present specification, the supply/drain ports 10 are referred to as a part of the pressure chambers 6.

Figure 2:
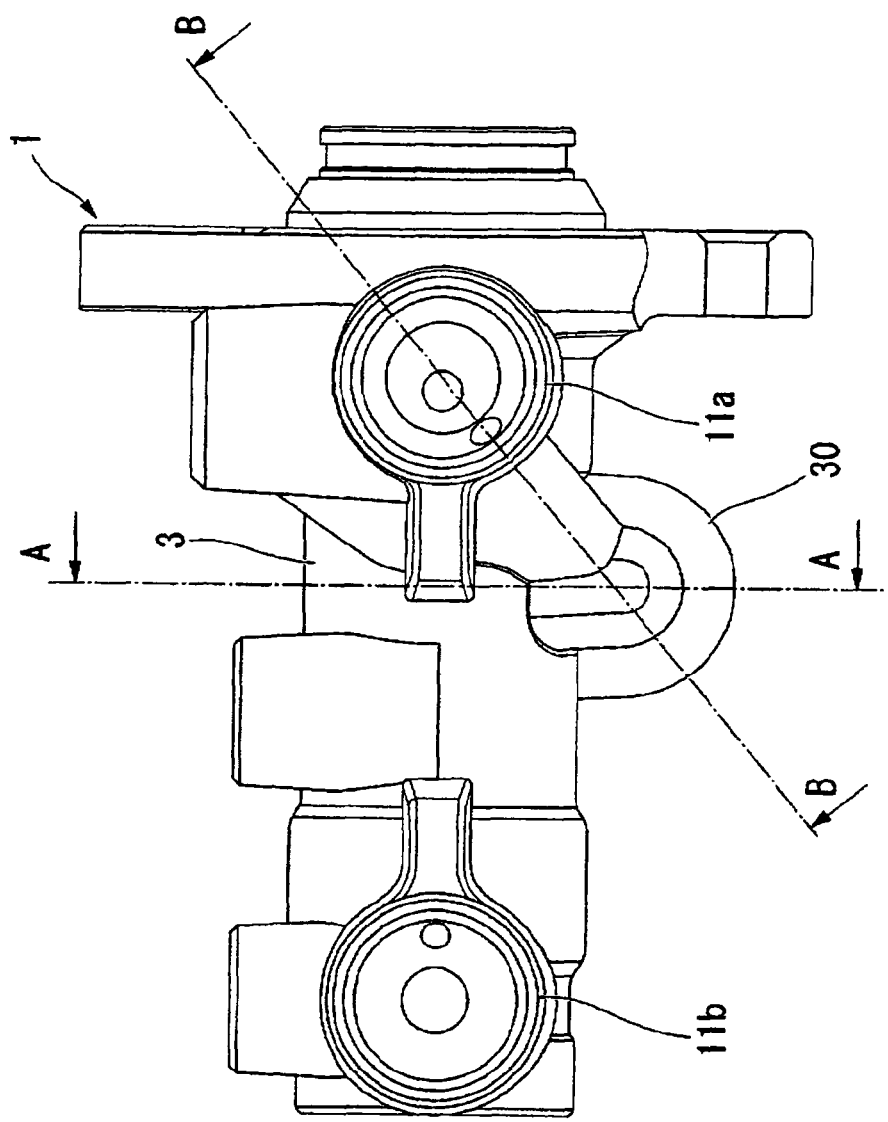
FIG. 2 is a plan view of the master cylinder of the same embodiment shown in FIG. 1.
Figure 3:
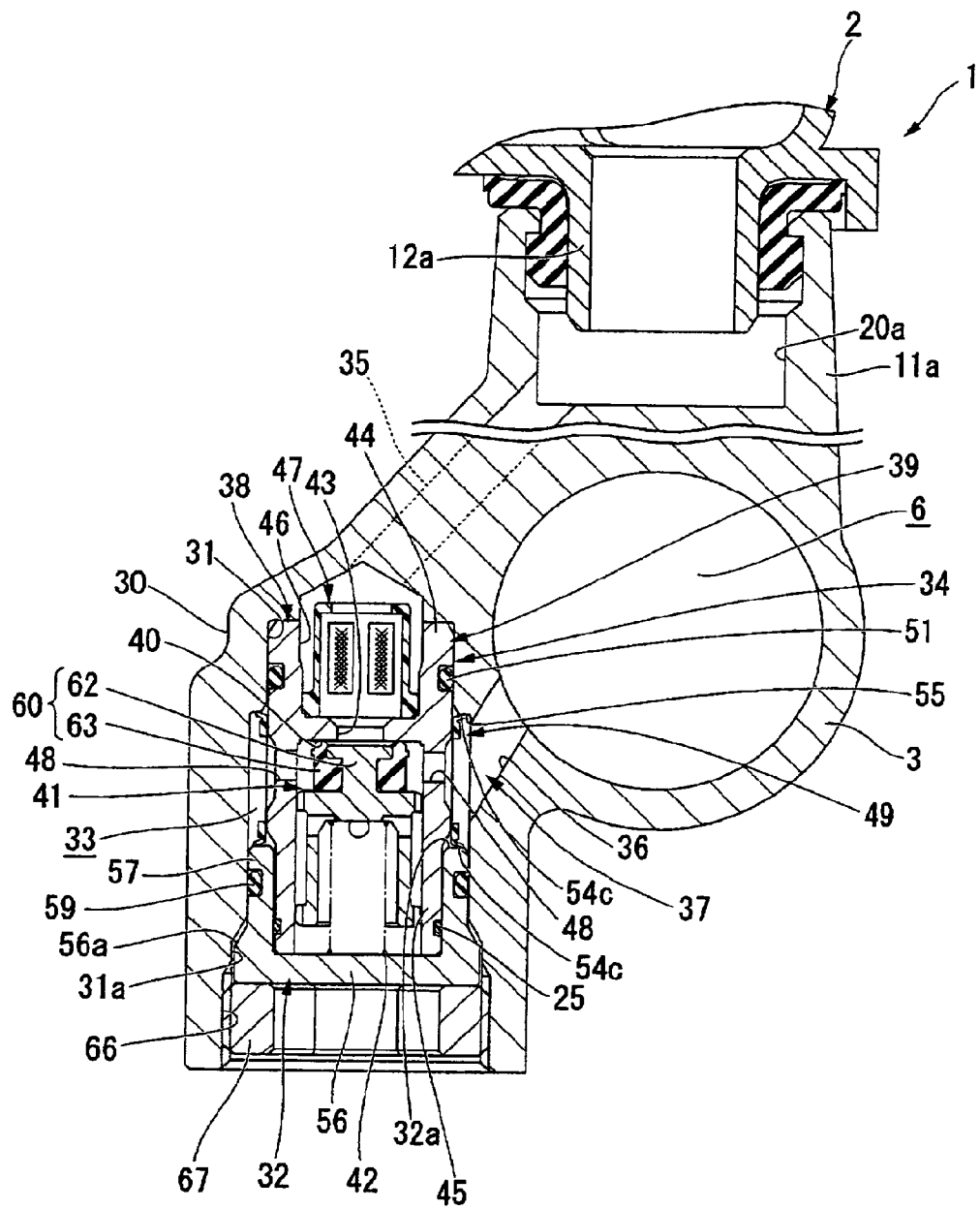
FIG. 3 is a cross-sectional view of the same embodiment in which a cross-section taken along line A-A and a cross-section taken along line B-B of FIG. 2 are combined.

As shown in FIGS. 1 to 3, a valve containing block 30 is integrally formed at a portion slightly in front of the boss 11a, on an outer lateral surface of the cylinder body 3. The valve containing block 30 is formed in a substantially cylindrical shape, so as to extend from a lateral side of the cylinder body 3 in a vertically downward direction (vertically downward direction when mounted in a vehicle body). As shown in FIG. 3, the valve containing block 30 has a recess 31 of a substantially circular shape in cross section. The recess 31 comprises a bottom surface formed integrally with the valve containing block 30 (cylinder body 3), and a side wall surrounding the bottom surface. The recess 31 has an open lower end. The open end of the recess 31 is closed by a covering member 32, so as to form a valve chamber 33 between the recess 31 and the covering member 32. The valve chamber 33 is provided therein with a check valve 34, which will be described later. The valve chamber 33 is formed to extend vertically downward from a lateral portion of the cylinder body 3, such that the entire portion of the valve chamber 33 is located at a lower position relative to the reservoir 2.

The valve chamber 33 has a reservoir passage 35 (upstream side passage) at an upper portion thereof (on a bottom surface of the recess 31). The reservoir passage 35 extends obliquely upward from the valve chamber 33 to connect the valve chamber 33 and the connection recess 20a (reservoir 2). The valve chamber 33 also has a pressure-chamber passage 36 (downstream side passage) formed in a lateral wall thereof. The pressure-chamber passage 36 connects the valve chamber 33 and the pressure chamber 6 in the cylinder body 3.

The reservoir passage 35, valve chamber 33, and pressure-chamber passage 36 described above constitute a bypass passage 37 bypassing the supply passage (the communication hole 13, annular groove 14, and return holes 17) described above and connecting the reservoir 2 and the pressure chamber 6.

In the present embodiment, the pressure-chamber passage 36 is directly connected to the pressure chamber 6. However, the pressure-chamber passage 36 can be connected to the supply/drain port 10 that is a part of the pressure chamber 6.

Figure 4:
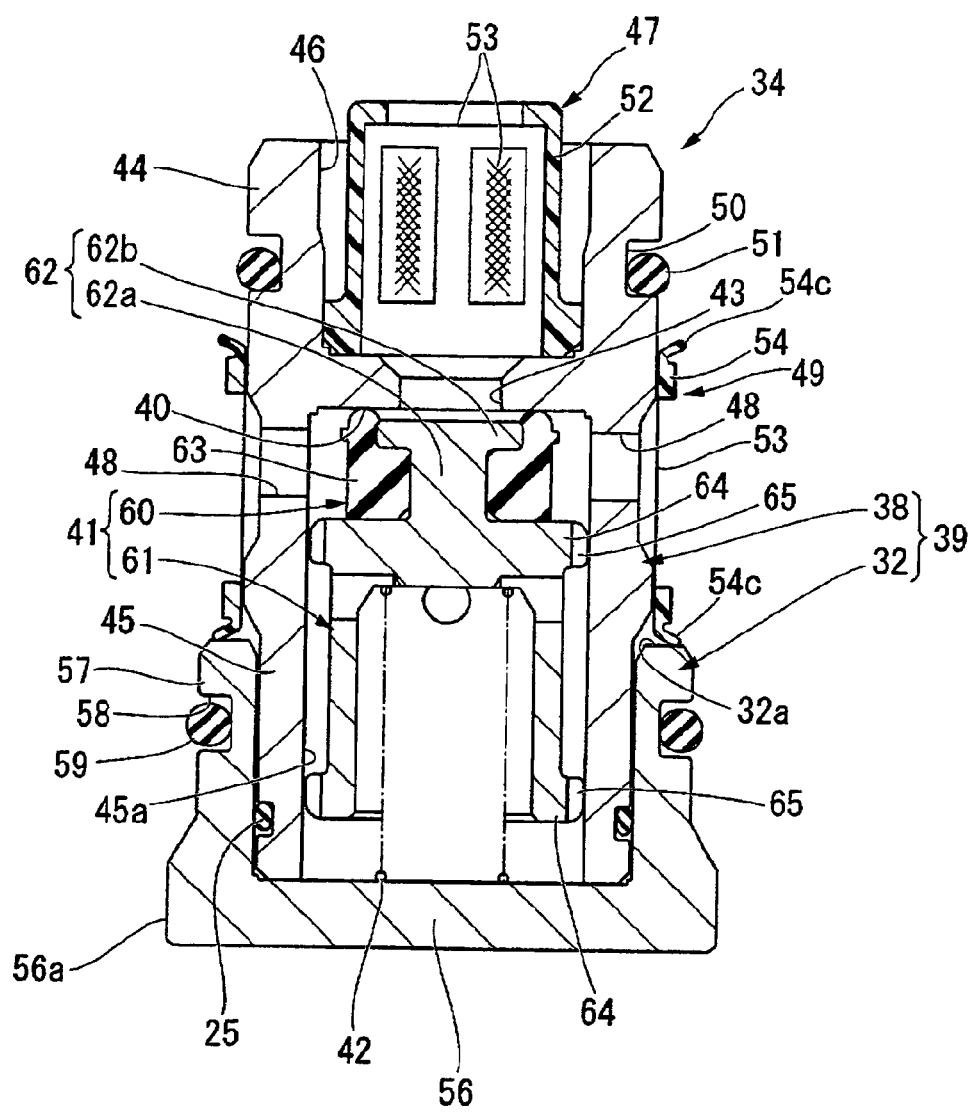
FIG. 4 is an enlarged cross-sectional view of a check valve of the same embodiment.

As enlarged in FIG. 4, the check valve 34 has a cartridge 39 comprising a bottomed cylindrical valve case 38 having an open end, and the covering member (cover) 32 for closing the open side of the valve case 38. In the cartridge 39, a valve body 41 adapted to be seated on and move away from a valve seat 40 and an urging spring 42 (urging means) for urging the valve body 41 toward the valve seat 40 are contained. As shown in FIG. 3, the covering member 32 of the cartridge 39 also functions as a cover for closing the opening of the recess 31 when the cartridge 39 is placed in the recess 31.

As shown in FIG. 4, the valve case 38 of the cartridge 39 comprises a head wall 44 (valve seat portion) including a valve hole 43 (communication passage) that is vertically formed through an axially central portion, and a cylindrical wall 45 (cylindrical portion) extending downward from the head wall 44. An underside surface of the head wall 44, which faces an inner space of the cylindrical wall 45, forms a valve seat 40. A recess 46 having a substantially cylindrical shape is formed at a central portion on a top surface of the head wall 44. A reservoir filter member 47 having a bottomed cylindrical shape is fixedly fitted in the recess 46. A plurality of radially-extending holes 48 are formed at an upper end of the cylindrical wall 45, so as to radially extend through the cylindrical wall 45. The cylindrical wall 45 is provided, on an outer surface thereof, with a pressure-chamber filter member 49 having a substantially cylindrical shape, so as to cover the openings of the radially-extending holes 48. Therefore, both of the reservoir filter member 47 and pressure-chamber filter member 49, which are respectively disposed on an upstream side and a downstream side in the valve chamber 33, are positioned in an outer area of the valve case 38.

In a conventional master cylinder, a check valve disposed in a bypass passage is configured to operate by a relatively small force generated only by a negative pressure acting on the check valve and a reaction force of a urging spring. Therefore, it is likely that a foreign material in operating liquid may be stuck in a sliding clearance of the check valve, and thereby operation of the check valve may be interrupted. In the present embodiment, the filters 47 and 49 are respectively disposed on the upstream side and the downstream side of the check valve in the bypass passage for preventing entry of a foreign material into the check valve, whereby it is possible to securely prevent a foreign material from being stuck in a sliding clearance of the check valve.

The head wall 44 has an annular groove 50 formed at an upper position relative to the radially-extending holes 48 on an outer surface of the head wall 44. The annular groove 50 is provided with an O-ring 51 (annular seal member) that is in tight contact with the inner surface of the valve chamber 33, so as to seal between the cartridge 39 and the valve chamber 33. As shown in FIG. 3, when the cartridge 39 is placed in the valve chamber 33, the O-ring 51 is positioned between the reservoir passage 35 and the pressure-chamber passage 36, so as to divide the valve chamber 33 into a reservoir side space and a pressure-chamber side space. The O-ring 51 extends outward beyond the outer surface of the valve case 38 by a predetermined amount, and an outer diameter of the O-ring 51 is larger than an inner diameter of the pressure-chamber filter member 49 fitted to the valve case 38, when the O-ring 51 is attached in the annular groove 50 before the cartridge 39 is placed into the valve chamber 33.

Figure 5:
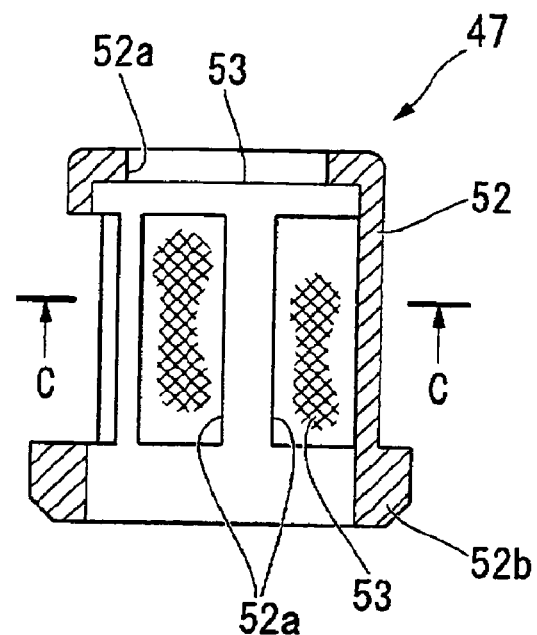
FIG. 5 is a cross-sectional view of a reservoir filter member taken along line D-D of FIG. 6 showing the same embodiment.
Figure 6:
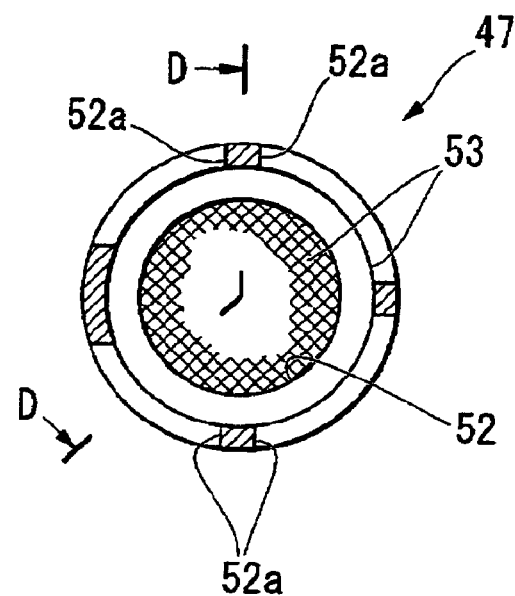
FIG. 6 is a cross-sectional view of the reservoir filter member taken along line C-C of FIG. 5 showing the same embodiment.

As shown in FIGS. 5 and 6, the reservoir filter member 47 has windows 52a in a side wall and a top wall of a bottomed cylindrical frame 52. The windows 52a are covered with meshes 53 that serves as a filter body. The frame 52 has an annular portion 52b having an increased thickness at a lower end thereof. The annular portion 52b is adapted to be tightly fitted into the recess 46 of the valve case 38. Therefore, the reservoir filter member 47, which is fitted in the recess 46 of the valve case 38 by the annular portion 52b having an increased thickness, is surrounded by a wall of the recess 46 of the valve case 38, with a predetermined space defined between the member 47 and the wall of the recess 46 at an upper position relative to the fitted portion. By this space, operating liquid not only flows onto the end surface of the reservoir filter member 47 but also into a portion around the member 47, whereby it is possible to reduce flow resistance when operating liquid passes through the filter member 47.

Figure 7:
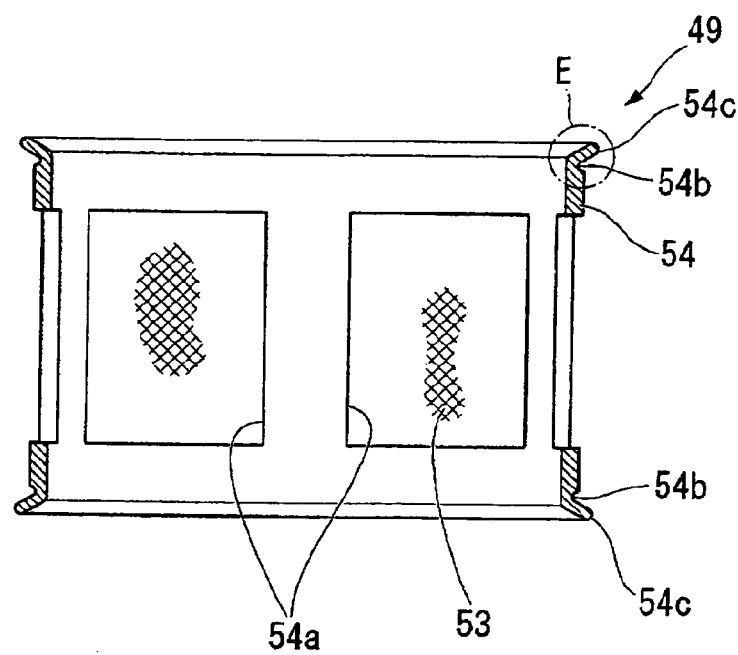
FIG. 7 is a vertical cross-sectional view of a pressure-chamber filter member of the same embodiment.
Figure 8:
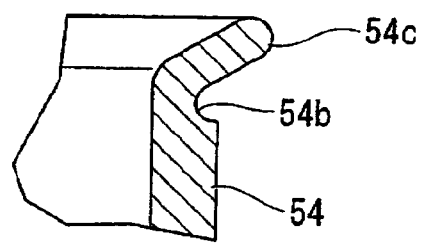
FIG. 8 is an enlarged cross-sectional view of section E of FIG. 7 showing the same embodiment.

As shown in FIGS. 7 and 8, the pressure-chamber filter member 49 includes a cylindrical frame 54 having a side wall in which a plurality of windows 54a are formed. The windows 54a are each covered with a mesh 53. As enlarged in FIG. 8, annular lips 54c (lip portion) having a reduced thickness are integrally formed at the top and bottom ends of the frame 54 and are each provided, at a base thereof, with an annular depression 54b. The annular lips 54c each have a tapered tip extending radially outward, such that its entire circumferential portion can be elastically deformed when a load is applied to it in an axial direction. As shown in FIG. 3, when the cartridge 39 is fitted in the valve chamber 33, the annular lip 54c on the top side of the pressure-chamber filter member 49 abuts against an annular stepped portion 55 formed at an upper position relative to the pressure-chamber passage 36 in the valve chamber 33, while the annular lip 54c on the bottom side of the pressure-chamber filter member 49 abuts against an end surface 32a of the covering member 32.

Figure 9:
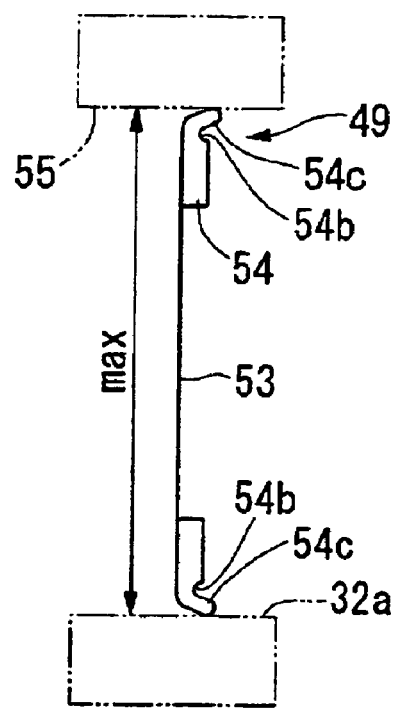
FIG. 9(A) and FIG. 9(B) are cross-sectional views showing exemplary change in a shape of the pressure-chamber filter member of the same embodiment.
Figure 9:
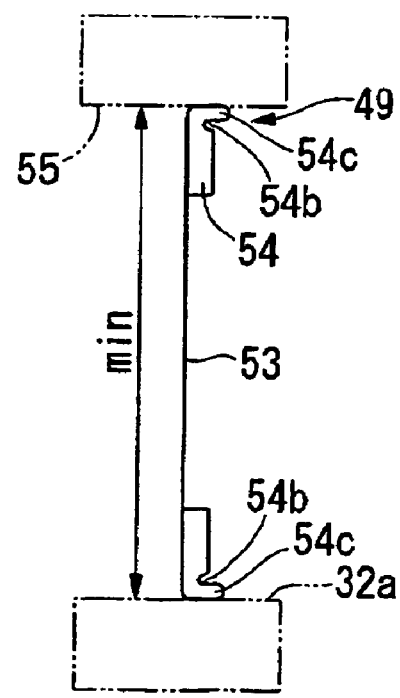
Figure 10:
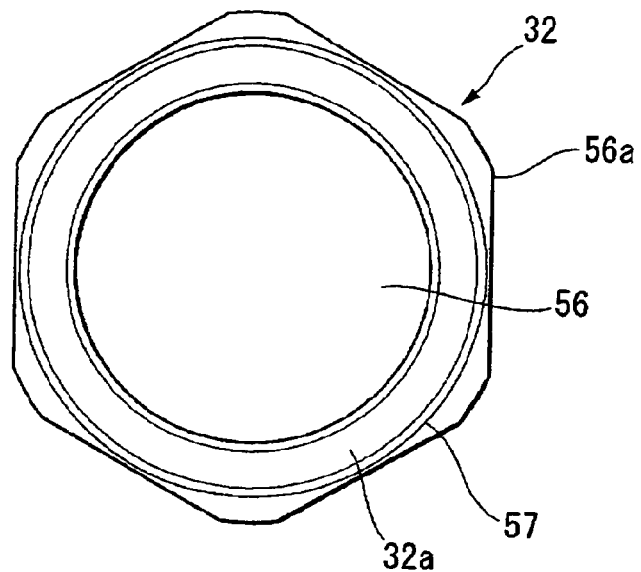
FIG. 10(A) shows a top view and FIG. 10(B) shows a vertical cross-sectional view of a covering member of the same embodiment.
Figure 10:
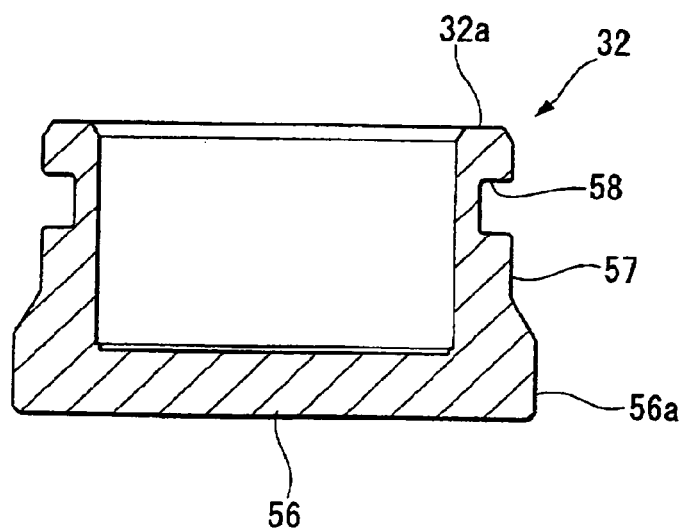

When the cartridge 39 is attached in the valve chamber 33, an axial distance between the annular stepped portion 55 and the end surface 32a of the covering member 32 may not be constant due to manufacturing error, assembling error or the like of the components. However, since the pressure-chamber filter member 49 abuts against the annular stepped portion 55 and the end surface 32a through the above-mentioned annular lips 54C, abutting clearances can be minimized (to a width equal to or less than pore sizes of the reservoir filter member 47 and the pressure-chamber filter member 49) due to elastic deformation of the annular lips 54C, even though the distance between the portion 55 and the surface 32a is not constant as shown in FIGS. 9 (A) and (B).

As shown in FIGS. 10(A) and (B), the covering member 32 of the cartridge 39 is formed into a substantially bottomed cylindrical shape as a whole. A side wall 57 extending from a bottom wall 56 is adapted to be fitted around an outer surface adjacent to a bottom end of the cylindrical wall 45 of the valve case 38. The side wall 57 has an annular groove 58 on an outer surface thereof. The annular groove 58 is provided with an O-ring 59 (seal member) for sealing between the annular groove 58 and the valve chamber 33.

It should be noted that, as shown in FIG. 4, an O-ring 25 (annular elastic member) having a small cross-section is fitted around an outer surface of a bottom end of the cylindrical wall 45 of the valve case 38. When the covering member 32 is fitted around the valve case 38, the O-ring 25 is elastically deformed to make tight contact with the covering member 32 and the valve case 38, so as to temporarily fix the covering member 32 and the valve case 38. The force exerted by the O-ring 25 to engage the covering member 32 and the valve case 38 is large enough to prevent the cartridge 39 from disassembling while the cartridge 39 is shipped or incorporated into the valve containing block 30. The outer circumference of the bottom wall 56 of the covering member 32 forms an octagonal locking portion 56a, which is adapted to be inserted into an octagonal locking groove 31a (refer to FIG. 3) formed in the recess 31 of the valve chamber 33.

The valve body 41, which is to be contained in the cartridge 39, is a lift valve that is adapted to move up and down inside the cylindrical wall 45 of the valve case 38. As shown in an enlarged view in FIG. 4, the valve body 41 comprises a valve portion 60 adapted to be seated on and move away from the valve seat 40 of the valve case 38, and a leg portion (sliding portion) 61 of a substantially cylindrical shape extending downward from the valve portion 60, such that an outer surface of the leg portion 61 is adapted to be slidably guided on an inner surface (guide portion) 45a of the cylindrical wall 45 of the valve case 38.

The valve portion 60 comprises a valve-portion body 62 made from an aluminum alloy and integrally formed with the leg portion 61, and a rubber valve seal 63 attached to the valve-portion body 62. The valve-portion body 62 has a support shaft 62a projecting along an axial center of the valve portion 60, and a flange 62b at a tip of the support shaft 62a. The annular valve seal 63 is fixedly fitted around the support shaft 62a and the flange 62b. The valve seal 63 has an end projecting upward of the flange 62b in an annular shape, such that the end of the valve seal makes elastic contact with the valve seat 40 around the valve hole 43 when the valve body 41 is displaced upward. However, when the valve seal 63 is pressed by a load greater than a predetermined value into contact with the valve seat 40, the metal flange 62b makes direct contact with the valve seat 40 due to elastic deformation of the valve seal 63. The outer diameter of the valve seal 63 is set to be smaller than the inner diameter of the cylindrical wall 45, and the radially extending holes 48 of the valve case 38 are positioned so as to face the outer surface of the valve seal 63 when the valve body 41 is displaced to an uppermost position. That is, the radially extending holes 48 are formed at a position where the holes 48 are not closed by the sliding portion of the valve body 41 on the cylindrical wall 45 of the valve case 38.

Figure 11:
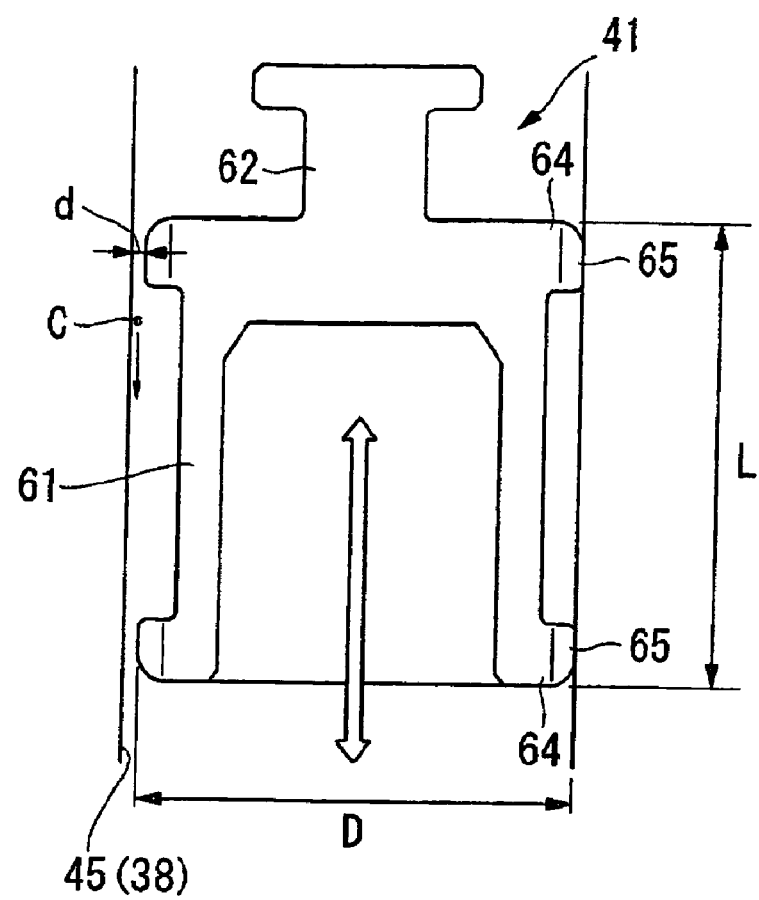
FIG. 11 is a cross-sectional view showing an exemplary dimensional relationship between a valve case and a valve body of the same embodiment.

The leg portion 61 has flanges 64 on outer surfaces of the top and bottom ends thereof. The flanges 64 are guided by the cylindrical wall 45 of the valve case 38. As shown in FIG. 11, a length L of the leg portion 61 including the flanges 64 in the sliding direction of the leg portion 61 is set to be longer than a maximum diameter D of the leg portion 61. The length of the cylindrical wall 45 of the valve case 38 in the sliding direction is set to be longer than the length L of the leg portion 61 in the sliding direction, whereby the sliding portion of the leg portion 61 makes sliding contact with the valve case 38 in a constant length when the valve body 41 moves up and down. The flanges 64 at the top and bottom of the leg portion 61 have a plurality of grooves 65 (passage) to allow passage of operating fluid.

The pore sizes of the above-mentioned reservoir filter member 47 and pressure-chamber filter member 49 attached to the valve case 38 are set to be smaller than a sliding clearance d between the leg portion 61 (sliding portion) of the valve body 41 and the cylindrical wall 45 of the valve case 38. More specifically, the size of the sliding clearance d is set to be within a range of 140 to 245 micron, preferably 180 micron, so that the valve body 41 is prevented from considerably inclining. The pore size of the filter member 49 is set to be equal to or more than 120 micron and less than 140 micron, preferably 130 micron. Therefore, a foreign material c having an outer diameter larger than the sliding clearance d is unfailingly caught by the reservoir filter member 47 and the pressure-chamber filter member 49. If a foreign material c can pass through the filter members 47 and 49, that means the foreign material c is smaller than the sliding clearance d between the valve body 41 and the valve case 38, whereby the material c is not stuck in the sliding clearance d.

As shown in FIG. 4, the urging spring 42 is placed between an underside surface of the valve-portion body 62 surrounded by the leg portion 61 and the bottom wall 56 of the covering member 32. In the present embodiment, the urging spring 42 is inserted with the valve body 41 in the cylindrical wall 45 of the valve case 38, and the covering member 32 is fitted onto the valve case 38, whereby the urging spring 42 is placed in a compressed state between the underside surface of the valve-portion body 62 and the bottom wall 56 of the covering member 32.

As shown in FIG. 3, the recess 31 of the valve chamber 33 has a female thread 66 at a portion closer to the opening on an inner surface of the recess 31. In this way, the covering member 32 of the cartridge 39 can be tightly fixed to the valve containing block 30 by fitting the cartridge 39 into the recess 31 and then screwing a nut 67 into the female thread 66.

In the above-described structure, when traction control is put into operation for a running vehicle, the control pump in the brake circuit sucks operating fluid from the master cylinder 1. When the pressure in the first pressure chamber 6 of the master cylinder 1 becomes lower than that in the reservoir 2 by more than a predetermined amount of pressure, the valve body 41 of the check valve 34 in the valve containing block 30 is displaced perpendicularly downward against a force of the urging spring 42. At this time, the valve portion 60 is separated from the valve seat 40 to connect the pressure-chamber passage 36 and the reservoir passage 35 of the bypass passage 37. In this way, operating fluid in the reservoir 2 is transmitted through the reservoir passage 35, valve hole 43, radially-extending holes 48, and pressure-chamber passage 36 in this order and supplied to the pressure chamber 6. Therefore, a sufficient amount of operating fluid can be promptly supplied from the pressure chamber 6 to the control pump, so as to reliably realize a desired traction control and prevent the pressure in the master cylinder 1 from becoming negative.

In the master cylinder 1, the reservoir filter member 47 and the pressure-chamber filter member 49 are respectively attached to the top and the outer surface of the valve case 38, and it is possible to unfailingly catch by the filter members 47 and 49 a large foreign material c directed to enter the check valve 34 through the reservoir passage 35 or the pressure-chamber passage 36. Therefore, it is possible to prevent the foreign material c from being stuck in the sliding clearance between the valve body 41 of the check valve 34 and the valve case 38. Especially, in the master cylinder 1, the pore sizes of the filter members 47 and 49 are set to be smaller than the sliding clearance d between the valve body 41 and the valve case 38. Therefore, even if a foreign material c passes through the filter members 47 and 49, it is not possible that the foreign material c interrupts operation of the valve body 41. As a result, in the master cylinder 1, it is possible to ensure smooth operation of the check valve 34 for a long period of time.

According to the master cylinder 1 of the present embodiment, the valve body 41 of the check valve 34 comprises two flanges 64 spaced apart from each other in a sliding direction, which makes it more difficult that the foreign material c is stuck in an axially intermediate area between the valve case 38 and the valve body 41. In addition, the plurality of grooves 65 are formed at the flanges 64, which aids in reducing the possibility that foreign materials could be caught by the flanges 64. Therefore, it is possible to further ensure smooth operation of the check valve 34.

Further, according to the master cylinder of the present embodiment, the reservoir filter member 47 and the pressure-chamber filter member 49 are contained in the valve chamber 33 together with the check valve 34, which makes attachment of the filter members 47 and 49 easy.

In this master cylinder 1, the valve case 38 and the covering member 32 are fixed by the O-ring 25 placed therebetween to form the cartridge 39. Despite its very simple structure, the cartridge 39, while containing the valve body 41 and the urging spring 42, can be fitted into the recess 31 of the valve chamber 33 and reliably secured in the recess 31 by tightening the nut 67 into the recess 31.

Especially in the present embodiment, the covering member 32 is disposed on the outer surface on one axial end side of the valve case 38, and the O-ring 51 having a larger outer diameter than the inner diameter of the pressure-chamber filter member 49 is attached to the outer surface on the other axial end side of the valve case 38. Therefore, it is possible to make temporary joint of the pressure-chamber filter member 49 with the outer surface of the cartridge 39 secure, when the cartridge 39 is not yet mounted in the valve chamber 33. That is, the pressure-chamber filter member 49 fitted onto the cartridge 39 is positioned between the covering member 32 and the O-ring 51, whereby the filter member 49 is securely prevented from falling off due to provision of the covering member 32 and the O-ring 51.

As another advantage of this master cylinder 1, a smaller number of components is required, since the covering member 32 of the cartridge 39 also serves as a lid for the recess 31 of the valve chamber 33.

Especially in the present embodiment, since the covering member 32 is formed as a separate body from the nut 67 which rotates for fixation, and is pressed and fixed by tightening the nut 67, the O-rings 51 and 59 placed between the cartridge 39 and the recess 31 are prevented from being twisted during the fixation. As a result, a stable sealing effect can be reliably obtained.

Figure 12:
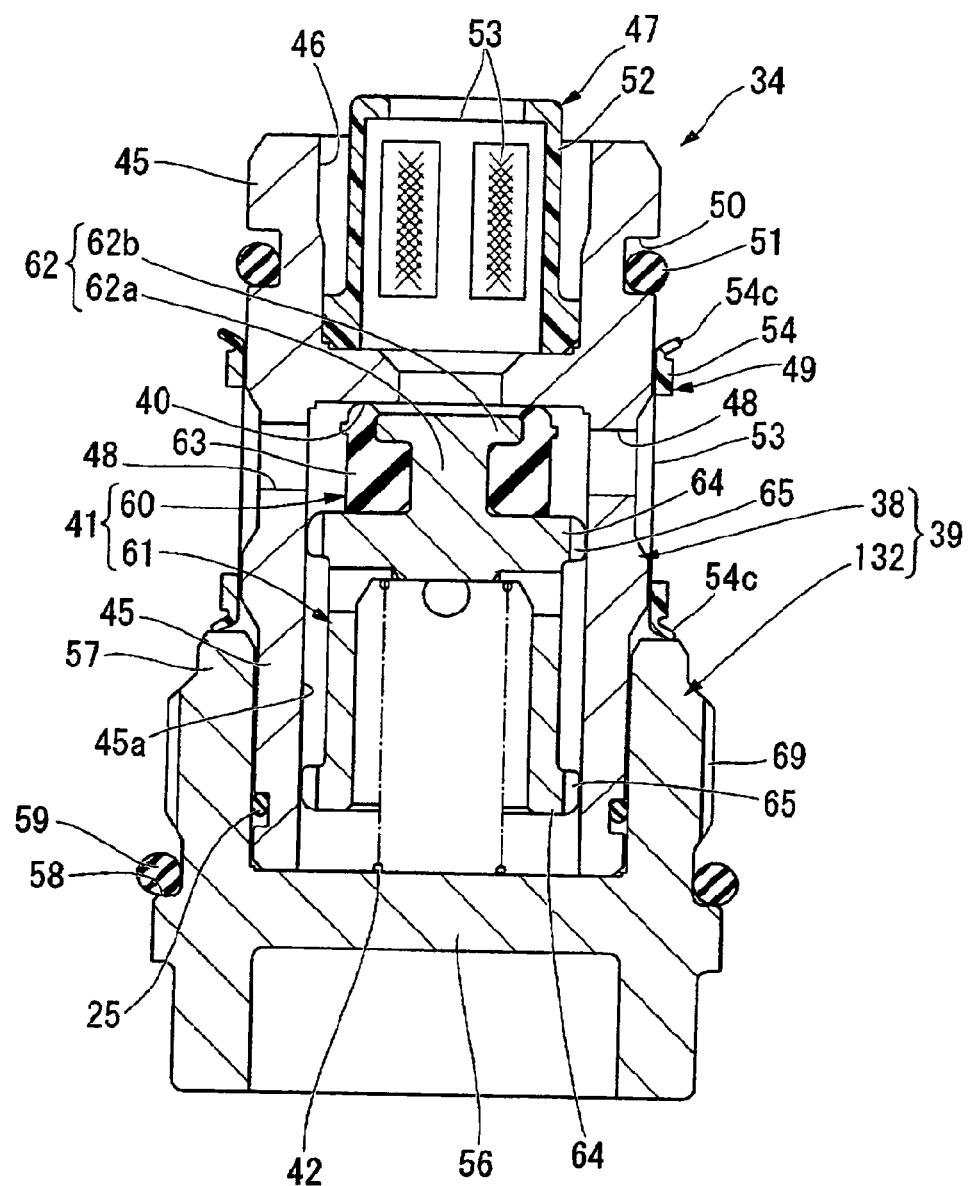
FIG. 12 is an enlarged cross-sectional view of a check valve according to a second embodiment of the present invention.

FIG. 12 shows a second embodiment. As shown in this figure, it is also possible to form a male thread 69 on an outer surface of a covering member 132 and directly screw the covering member 132 into the recess of the valve chamber. This further reduces the number of components.

In the master cylinder 1, the cylindrical wall 45 for guiding a sliding movement of the leg portion 61 of the valve body 41, and the valve seat 40 are integrally formed as the valve case 38. Therefore, the valve body 41 can be seated on the valve seat 40 with increased precision. Further, since the length of the leg portion 61 of the valve body 41 in its sliding direction is set to be longer than the diameter of the leg portion 61, the posture of the valve body 41 during its operation can be further stabilized.

Especially in the present embodiment, the length of the cylindrical wall 45 of the valve case 38 in the sliding direction is set to be longer than a sum of the length of the leg portion 61 of the valve body 41 in the sliding direction and the length of vertical stroke of the valve body 41. Therefore, the valve body 41 is not interrupted on the sliding portion and can be constantly stably displaced upward and downward. Therefore, in the master cylinder 1, the valve body 41 can be seated on the valve seat 40 with a constantly stable posture, and the valve seal 63 is prevented from partially contacting the valve seat 40.

Further, in the master cylinder 1, the valve portion 60 of the valve body 41 comprises the metal valve-portion body 62 and the rubber valve seal 63. The valve seal 63 is adapted to make tight contact with the valve seat 40 for liquid-tight closure. When the valve body 41 is subjected to a high pressure from the pressure chamber 6 to press the valve seal 63 against the valve seat 40, the valve-portion body 62 is brought into direct contact (metal-contact) with the valve seat 40, so as to prevent any gap from being formed in a boundary portion between the pressure chamber 6 and the reservoir 2 (atmospheric pressure) (a portion surrounded by the valve seat 40 due to the contact of the valve seal 63), which would cause damage to the valve seal 63 if the valve seal 63 were drawn into the gap. This enables lasting protection and liquid tightness of the valve seal 63.

Further, in the master cylinder 1, the check valve 34 is disposed in the valve containing block 30, such that the valve body 41 moves in the direction of gravity. In this way, any air flow from the pressure chamber 6 into the valve chamber 33 can be discharged to the outside as the valve body 41 moves. Particularly, in the present embodiment, the reservoir 2 is placed at an upper position relative to the valve chamber 33; and an upper end of the valve chamber 33 and the reservoir 2 are connected by the reservoir passage 35 extending obliquely upward. Therefore, any air flow into the valve chamber 33 can be efficiently discharged into the reservoir 2.

Figure 13:
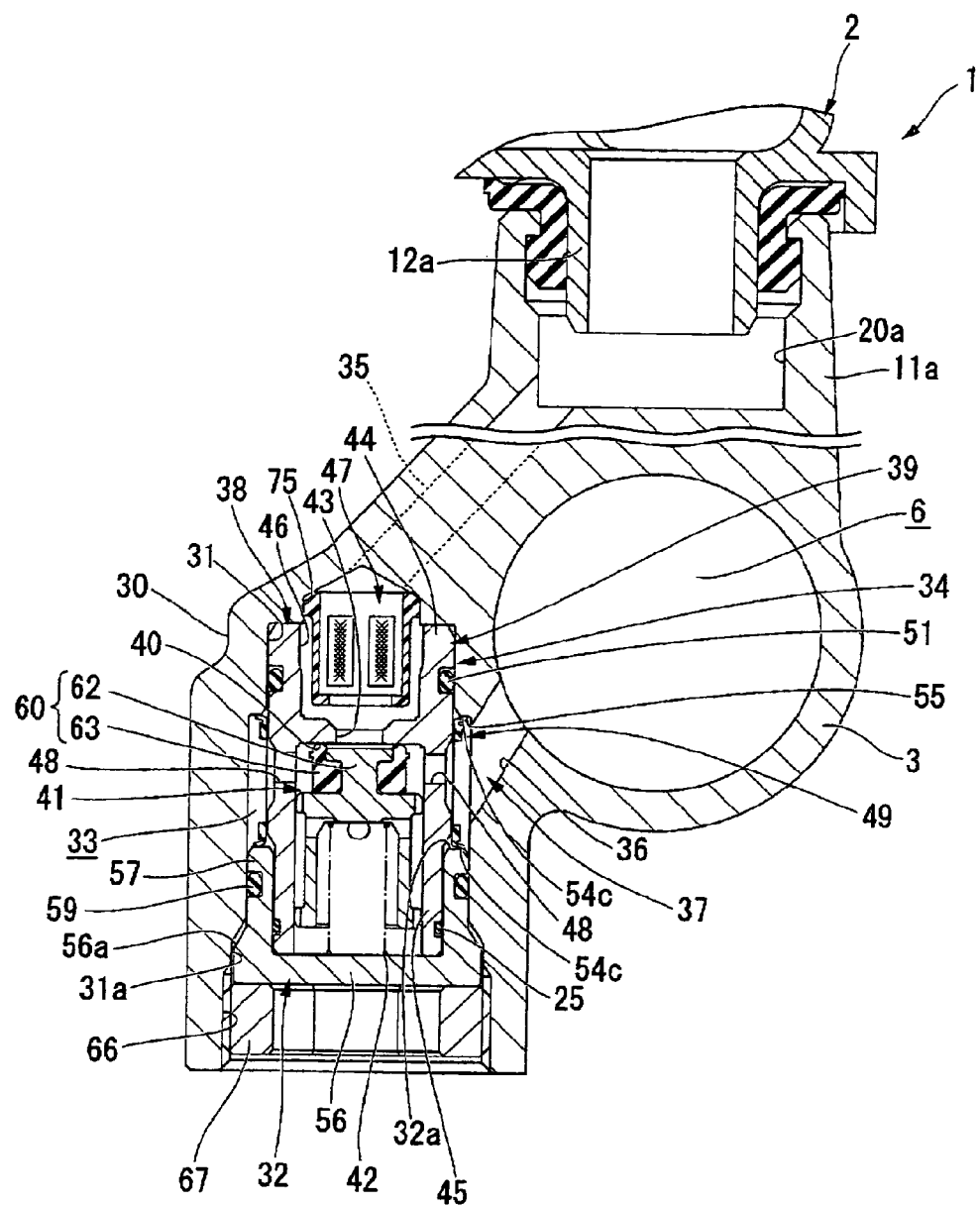
FIG. 13 is a cross-sectional view similar to FIG. 3, showing a third embodiment of the present invention.

In the above-described embodiments, the reservoir filter member 47 is fitted into the recess 46 on the top surface of the valve case 38, although the reservoir filter member 47 may be fixedly fitted into a fitting hole 75 formed on a bottom surface of the recess 31 of the valve containing block 30, as in a third embodiment shown in FIG. 13.

Figure 14:
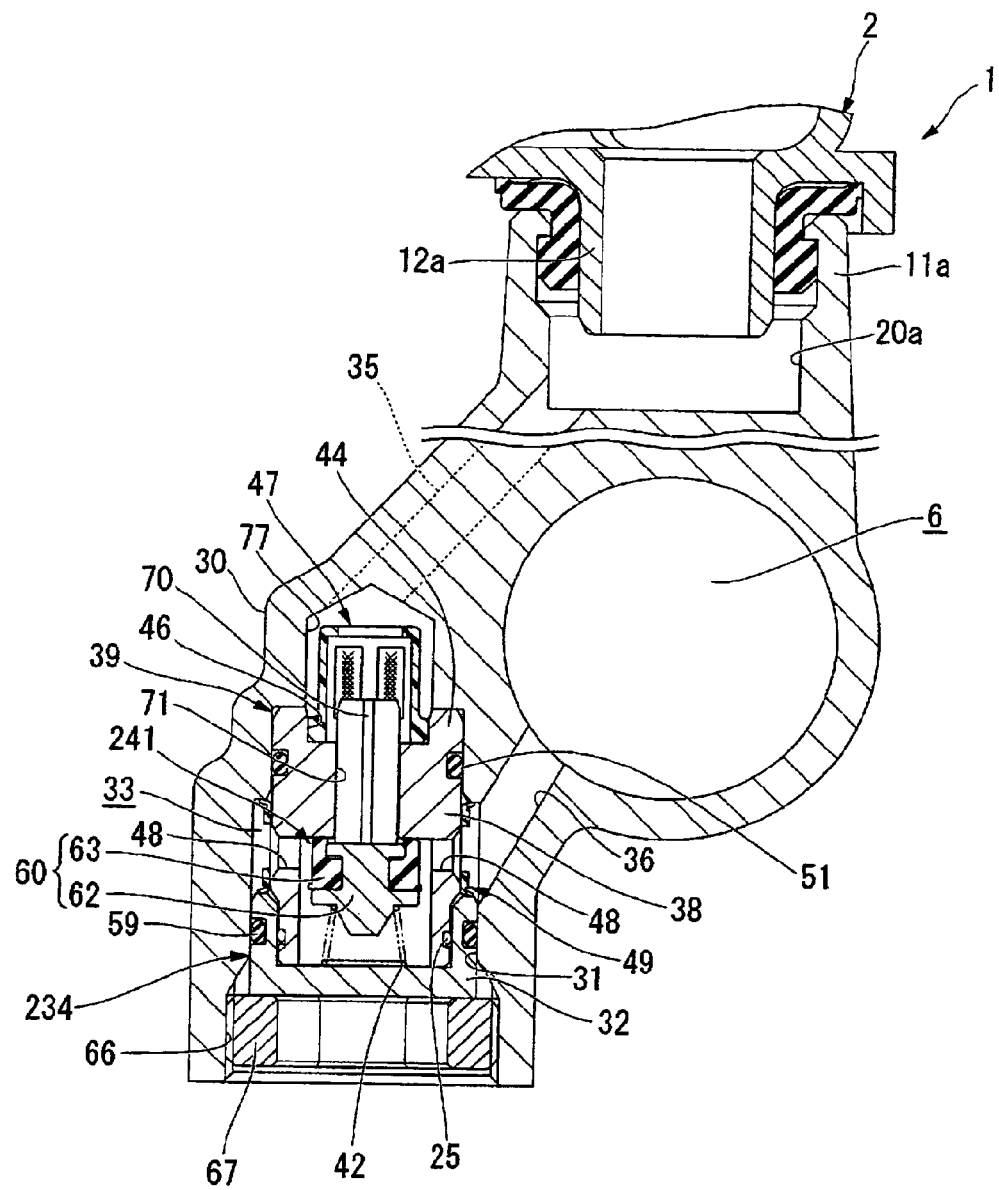
FIG. 14 is a cross-sectional view similar to FIG. 3, showing a fourth embodiment of the present invention.
Figure 15:
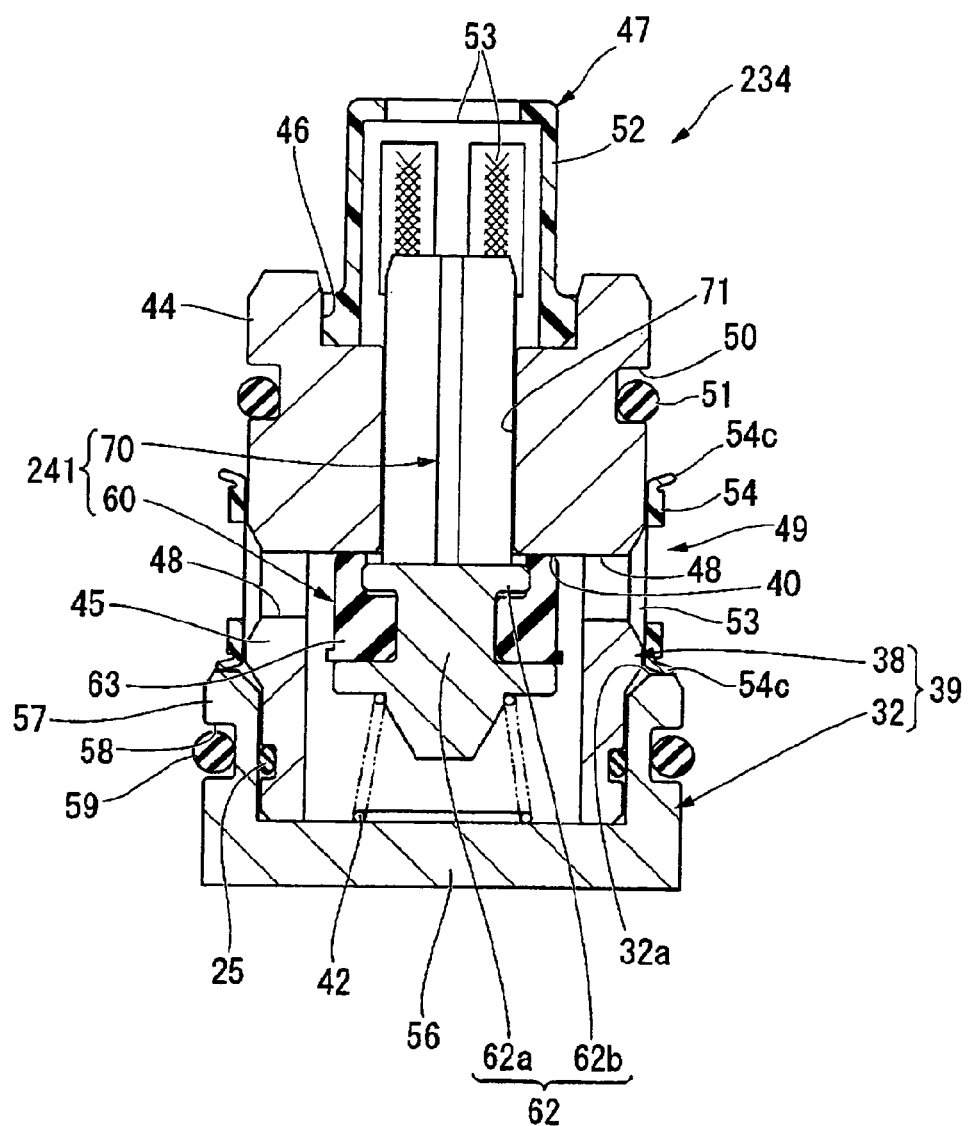
FIG. 15 is an enlarged cross-sectional view of a check valve of the embodiment shown in FIG. 14.

Next, a fourth embodiment of the present invention will be described with reference to FIGS. 14 and 15. The fourth embodiment has a basic structure similar to that of the first embodiment, but the fourth embodiment comprises a check valve 234 accommodated in a recess 31 of a valve chamber 33, which is structurally different from the check valve 34 in the first embodiment.

Specifically, the structure of the check valve system 234 is the same as that of the check valve 34 of the first embodiment; in that, the cartridge 39 comprises the valve case 38 and the covering member 32; and a valve body 241 and an urging spring 42 are accommodated in the cartridge 39. However, the structure of the valve body 241 and the structure of a guide portion for the valve body 241, and the structure of an attachment portion of a reservoir filter member 47 are significantly different from the corresponding portions of the first embodiment.

The valve body 241 has a guide shaft 70 extending from the valve portion 60 including the metal valve-portion body 62 and the rubber valve seal 63, the guide shaft 70 having a substantially cross shape in cross-section. The guide shaft 70 is slidably inserted in a guide hole 71 of the head wall 44 of the valve case 38, the guide hole 71 also serving as a valve hole. In the present embodiment, the guide shaft 70 of the valve body 241 is guided by the guide hole 71, whereby the valve body 241 moves up and down. The axial length of the guide shaft 70 is set to be at least greater than the sum of an axial length of the guide hole 71 and a stroke length of the valve body 241. In this way, the valve body 241 can always be guided stably along a certain length in the sliding direction.

In the fourth embodiment, the guide shaft 70 of the valve body 241 extends upward beyond the guide hole 71 of the valve case 38. A relatively shallow recess 46 is formed on a top surface of the valve case 38, and a reservoir filter member 47 is fittedly fixed in the recess 46. The guide shaft 70 of the valve body 241 extends into the reservoir filter member 47. Therefore, in the fourth embodiment, an axial length of the valve case 38 can be reduced. In the fourth embodiment, since the recess 46 of the valve case 38 is shallow, the reservoir filter member 47 significantly protrudes from the top surface of the valve case 38. A recess 77 is formed at a bottom surface of the recess 31 of the valve containing block 30 for receiving the protruding reservoir filter member 47. A predetermined space is maintained between the top portion and outer surface of the reservoir filter member 47, and the recess 77.

Although the valve body 241 and its guide portion of the fourth embodiment are slightly different in structure from the corresponding portions of the first embodiment, the fourth embodiment can bring about substantially the same effects as those brought about by the first embodiment. Additional advantage of the fourth embodiment is that the size of the cartridge 39 can be reduced because the guide shaft 70 protrudes into the reservoir filter member 47.

Figure 16:
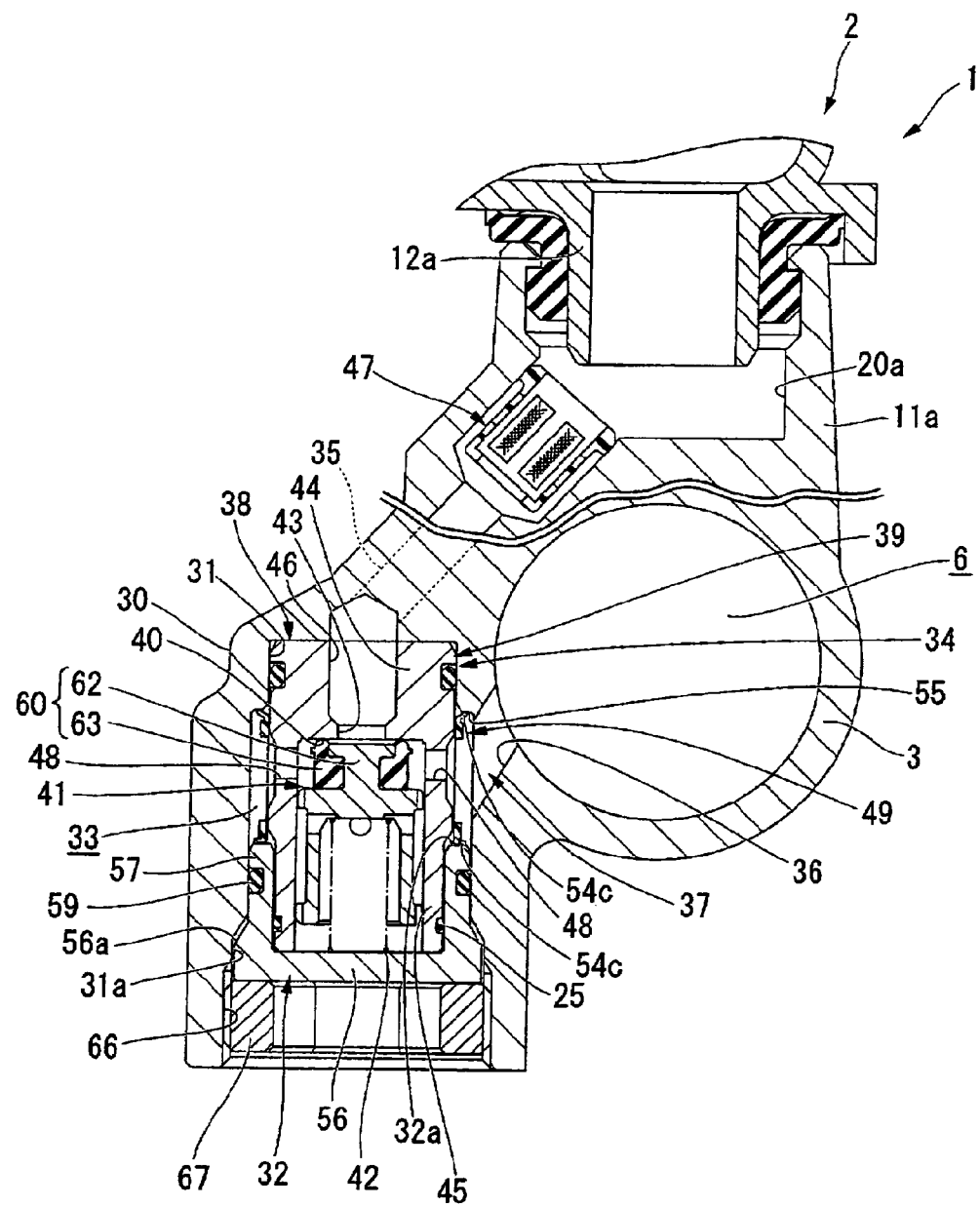
FIG. 16 is a cross-sectional view similar to FIG. 3, showing a fifth embodiment of the present invention.

Having described preferred embodiments of the invention, it is to be understood that the invention is not limited to those particular embodiments, and that various changes and modifications may be effected therein without departing from the scope and spirit of the invention. For example, in the above-described embodiments, the filter members are disposed in the valve chamber. However, the reservoir filter member 47 may be disposed at a position in the reservoir passage 35 facing the connection recess 20a, as in a fifth embodiment shown in FIG. 16. Further, in the above-described embodiments, the master cylinder is embodied by a tandem master cylinder. However, the master cylinder may be embodied by a single type master cylinder having a single piston.

In sum, the structures and effects of the above-mentioned embodiments are as follows.

(1) According to the above-described embodiments, the master cylinder comprises the cylinder body including the pressure chamber therein, into which operating liquid is introduced from the reservoir, the supply passage for supplying the operating liquid from the reservoir to the pressure chamber, and the piston slidably fitted in the cylinder body to define the pressure chamber. The piston is adapted to open or close the supply passage according to a sliding position thereof. The master cylinder further comprises the bypass passage for bypassing the supply passage to connect the reservoir and the pressure chamber. The bypass passage includes the check valve adapted to open to allow a flow of the operating liquid from the reservoir to the pressure chamber when a pressure in the pressure chamber is lower than that in the reservoir. In the master cylinder, the check valve is a lift valve in which the valve body seats on or moves away from the valve seat, and the valve body of the lift valve is disposed inside the valve case including the valve seat and the guide portion for slidably guiding the valve body which are formed as a single member. Therefore, it is possible to easily improve precision with which the valve body is seated on the valve seat.

(2) According to the first and second embodiments, the sliding portion of the valve body has a circular outer circumference, and the length of the sliding portion in the sliding direction is set to be longer than the diameter of the sliding portion. Therefore, it is possible to stabilize an operation of the valve body, and to seat the valve body on the valve seat with further improved precision.

(3) According to the first and second embodiments, the length of the guide portion in the sliding direction is set to be longer than the length of the sliding portion of the valve body, which is guided by the guide portion, in the sliding direction. Therefore, it is possible to always obtain a stable effect of guiding the sliding portion of the valve body by the guide portion, and thereby it is possible to seat the valve body on the valve seat with further improved precision.

(4) According to the above-described embodiments, the valve portion of the valve body comprises the valve-portion body formed integrally with the sliding portion, and the rubber valve seal adapted to be seated on and move away from the valve seat. Therefore, since the rubber valve seal can make tight contact with the valve seat, it is possible to securely maintain a valve-closing state.

(5) According to the above-described embodiments, when the valve seal is compressed in the sliding direction by more than a predetermined amount, the valve-portion body abuts against the valve seat, thereby preventing any gap formation in a boundary portion between the pressure chamber and the reservoir when the valve seal is pressed against the valve seat. Therefore, it is prevented that the valve seal is drawn into a gap and is damaged, whereby it is possible to keep good performance of the valve seal for a long period of time.

(6) According to the above-described embodiments, the master cylinder comprises the cylinder body which supplies to an outside pressurized operating liquid generated in the pressure chamber in the cylinder body, the supply passage formed in the cylinder body for supplying to the pressure chamber the operating liquid reserved in the reservoir, the bypass passage for bypassing the supply passage to connect the reservoir and the pressure chamber, and the check valve disposed in the bypass passage and allowing supply of the operating liquid only from the reservoir to the pressure chamber. The bypass passage includes the valve chamber in which the check valve is disposed, the reservoir passage for connecting the valve chamber and the reservoir, and the pressure-chamber passage for connecting the valve chamber and the pressure chamber. The check valve is a lift valve in which the valve body is seated on and move away from the valve seat. The valve body of the lift valve is slidably disposed in the valve case contained in the valve chamber. The valve case includes the valve seat which is connected to the reservoir passage and which the valve body is seated on or moves away from, and the guide portion for slidably guiding the valve body. The valve seat and the guide portion are formed as a single member. Therefore, it is possible to easily improve precision with which the valve body is seated on the valve seat.

(7) According to the above-described embodiments, the valve case includes the cylindrical portion and the valve seat portion perpendicular to the cylindrical portion. The inner surface of the cylindrical portion serves as the guide portion. The valve seat portion is connected to the reservoir passage. The radially extending holes in communication with the pressure-chamber passage are formed through the side wall of the cylindrical portion. Therefore, it is possible to form the bypass passage through the valve case.

(8) According to the above-described embodiments, the radially-extending holes are formed in an area of the side wall of the cylindrical portion where the valve body does not slide when the valve body operates. Therefore, it is unlikely that the radially extending holes disturb a sliding movement of the valve body.

(9) According to the first to third and fifth embodiments, the sliding portion of the valve body which is guided by the guide portion comprises the two flanges spaced apart from each other in the sliding direction. Therefore, it is possible to reduce the possibility that foreign materials could be stuck between the guide portion and the axially intermediate portion of the valve body, and therefore possibility for malfunction of the check valve can be reduced.

(10) According to the first and second embodiments, the passages which allow a flow of the operating liquid are formed at the flanges. Therefore, it is possible to reduce the possibility that foreign materials could be stuck at the flanges.

(11) According to the above-described embodiments, the valve body is disposed in the valve chamber such that the valve body moves in the direction of gravity. Therefore, it is possible to effectively discharge air in the valve chamber to the outside by an operation of the valve body.

(12) According to the above-described embodiments, the valve chamber is disposed at a gravitationally lower position than the reservoir, and the upper portion of the valve chamber is connected to the reservoir through the bypass passage. Therefore, it is possible to unfailingly discharge air in the valve chamber to the reservoir when the valve body operates.

(13) According to the above-described embodiments, the master cylinder comprises the cylinder body into which the operating liquid is introduced from the reservoir, the piston slidably fitted in the cylinder body to define the pressure chamber in the cylinder body, the supply passage which is formed in the cylinder body and supplies the operating liquid from the reservoir to the pressure chamber, the bypass passage for bypassing the supply passage to connect the reservoir and the pressure chamber, and the check valve which is disposed in the bypass passage and opens when the pressure in the pressure chamber is lower than that in the reservoir. The bypass passage includes the valve chamber in which the check valve is disposed, and connects the valve chamber to the reservoir and the pressure chamber. The check valve is a lift valve in which the valve body is seated or move away from the valve seat. The valve body of the lift valve is slidably disposed in the valve case contained in the valve chamber. The valve case comprises the cylindrical portion, and the valve seat portion including a surface perpendicular to the axis of the cylindrical portion. The cylindrical portion and the valve seat portion are formed as a single member. The valve seat portion comprises the communication passage connected to the reservoir, and the valve seat comprising the surface which the valve body is seated on or moves away from. The guide portion for slidably guiding the sliding portion of the valve body is formed on the inner surface of the cylindrical portion. The valve case is fixed to the cylinder body by the covering member for closing the valve chamber. Therefore, the valve case makes it possible to easily improve precision with which the valve body is seated on the valve seat.

(14) According to the above-described embodiments, the radially extending holes in communication with the pressure-chamber passage are formed through the side wall of the cylindrical portion. Therefore, it is possible to form the bypass passage through the valve case.

(15) According to the above-described embodiments, the radially-extending holes are formed in an area on the valve seat side of the guide portion where the sliding portion of the valve body does not slide. Therefore, it is unlikely that the radially extending holes disturb a sliding movement of the valve body.

(16) According to the above-described embodiments, the valve portion of the valve body which is seated on and moves away from the valve seat comprises the valve-portion body formed integrally with the sliding portion and the rubber valve seal which is attached to the valve-portion body and is seated on and moves away from the valve seat. The lift valve is urged toward the valve seat by the urging means. Therefore, it is possible to securely maintain a valve-closing state by causing the rubber valve seal to make tight contact with the valve seat.

(17) According to the above-described embodiments, when the valve seal is compressed in the sliding direction of the valve body by a pressure equal to or more than a predetermined value, the valve-portion body abuts against the valve seat. Therefore, any gap disappears in the boundary portion between the pressure chamber and the reservoir when the valve seal is pressed against the valve seat, whereby it is prevented that the valve seal is drawn into a gap and is damaged, and therefore it is possible to maintain good performance of the valve seal for a long period of time.

(18) According to the first and second embodiments, the sliding portion of the valve body has a circular outer circumference, and the length of the sliding portion in the sliding direction is set to be longer than the diameter of the sliding portion. The sliding portion includes two flanges spaced apart from each other in the sliding direction. Therefore, it is possible to stabilize an operation of the valve body, and to seat the valve body on the valve seat with further improved precision.

(19) According to the first and fourth embodiments, the covering member comprises the covering body for closing the open end of the valve chamber, and the screw member formed as a separate body from the covering body, and screwed into the cylinder body. Therefore, the O-ring disposed on the covering body is prevented from being twisted when the covering member is attached, and therefore it is possible to ensure stable sealing performance.

(20) According to the above-described embodiments, the valve body is made of a metal material containing aluminum, and is urged toward the valve seat by the urging means. Therefore, the valve body is light in weight, and it is possible to quickly open and close in response to increase and decrease in a hydraulic pressure in the pressure chamber.

(21) According to the above-described embodiments, the master cylinder comprises the cylinder body including the pressure chamber therein, into which operating liquid is introduced from the reservoir, the supply passage for supplying the operating liquid from the reservoir to the pressure chamber, and the piston slidably fitted in the cylinder body to define the pressure chamber. The piston is adapted to open or close the supply passage according to a sliding position thereof. The master cylinder further comprises the bypass passage for bypassing the supply passage to connect the reservoir and the pressure chamber. The bypass passage includes the check valve adapted to open to allow a flow of the operating liquid from the reservoir to the pressure chamber when a pressure in the pressure chamber is lower than that in the reservoir. In the master cylinder, filters are respectively disposed on the upstream side and downstream side of the check valve in the bypass passage for preventing entry of foreign materials into the check valve. Therefore, provision of the filters makes it possible to restrain entry of foreign materials which otherwise might disturb an operation of the check valve, and thereby possible to ensure smooth operation of the check valve.

(22) According to the above-described embodiments, the check valve is a lift valve in which the valve body is urged toward the valve seat by the urging means. The valve body includes the valve portion which is seated on and moves away from the valve seat, and the sliding portion. The guide portion for slidably guiding the sliding portion is disposed in the bypass passage. The aperture sizes of the filters are set to be smaller than the sliding clearance between the sliding portion and the guide portion. Therefore, it can be securely prevented that a foreign material that has passed through the filter is stuck at the sliding portion of the check valve.

(23) According to the first to third and fifth embodiments, the sliding portion of the valve body comprises the two flanges spaced apart from each other in the sliding direction. Therefore, it is possible to reduce the possibility that foreign materials could be stuck between the guide portion and the axially intermediate portion of the valve body, and therefore possibility for malfunction of the check valve can be further reduced.

(24) According to the first to third and fifth embodiments, the passages which allow a flow of the operating liquid are formed at the flanges. Therefore, it is possible to reduce the possibility that foreign materials could be stuck at the flanges.

(25) According to the above-described embodiments, the master cylinder comprises the cylinder body which supplies to an outside pressurized operating liquid generated in the pressure chamber in the cylinder body, the supply passage formed in the cylinder body for supplying to the pressure chamber the operating liquid reserved in the reservoir, the bypass passage for bypassing the supply passage to connect the reservoir and the pressure chamber, and the check valve disposed in the bypass passage and allowing supply of the operating liquid only from the reservoir to the pressure chamber. The bypass passage includes the valve chamber in which the check valve is disposed, the reservoir passage connecting the valve chamber and the reservoir, and the pressure-chamber passage connecting the valve chamber and the pressure chamber. The valve chamber comprises the recess formed integrally with the cylinder body, and the covering member closing the recess. In addition, filters are respectively disposed between the reservoir and the check valve and between the pressure chamber and the check valve for preventing entry of foreign materials into the check valve. Therefore, provision of the filters makes it possible to restrain entry of foreign materials which otherwise might disturb an operation of the check valve, and thereby possible to ensure smooth operation of the check valve.

(26) According to the above-described embodiments, the check valve is a lift valve in which the valve body is seated on and moves away from the valve seat. The guide portion for slidably guiding the sliding portion of the valve body is disposed in the valve chamber. The pore sizes of the filters are set to be smaller than the sliding clearance between the sliding portion and the guide portion. Therefore, it can be securely prevented that a foreign material that has passed through the filter is stuck at the sliding portion of the check valve.

(27) According to the first to fourth embodiments, the recess comprises the bottom surface formed integrally with the cylinder body, and the side wall surrounding the bottom surface, and the filters are contained in the valve chamber. Therefore, the filters can be easily attached.

(28) According to the first, second and fourth embodiments, the master cylinder comprises the cylinder body into which operating liquid is introduced from the reservoir, the piston slidably fitted in the cylinder body to define the pressure chamber in the cylinder body, the supply passage formed in the cylinder body and used for supplying the operating liquid from the reservoir to the pressure chamber, the bypass passage for bypassing the supply passage to connect the reservoir and the pressure chamber, and the check valve disposed in the bypass passage and adapted to open when the pressure in the pressure chamber is lower than that in the reservoir. The bypass passage includes the valve chamber in which the check valve is disposed, and connects the valve chamber to the reservoir and the pressure chamber. The valve chamber comprises the recess formed integrally with the cylinder body, and the covering member closing the recess. The valve case including the valve seat is disposed in the valve chamber. The valve body of the check valve is contained in the valve case so as to be able to be seated on and move away from the valve seat. The filters are respectively disposed on the valve case for preventing entry of foreign materials from the upstream side and the downstream side of the check valve into the check valve. Therefore, provision of the filters makes it possible to restrain entry of foreign materials which otherwise might disturb an operation of the check valve, and thereby possible to ensure smooth operation of the check valve.

(29) According to the first, second and fourth embodiments, the check valve is a lift valve in which the valve body is urged toward the valve seat by the urging means, and the valve body is seated on and moves away from the valve seat. The guide portion for slidably guiding the sliding portion of the valve body is disposed in the valve case. The pore sizes of the filters are set to be smaller than the sliding clearance between the sliding portion and the guide portion. Therefore, it can be securely prevented that a foreign material that has passed through the filter is stuck at the sliding portion of the check valve.

(30) According to the first, second and fourth embodiments, the covering member is fitted around the outer surface of the valve case. The valve body of the check valve is contained in a space defined by the valve case and the covering member, and the outer surface of the covering member is sealingly fitted in the inner surface of the valve chamber. Therefore, the valve chamber can be sealingly closed by use of the covering member of the cartridge containing the valve body of the check valve.

(31) According to the above-described embodiments, annular lips are formed at the axial ends of the cylindrical filter attached around the outer surface of the valve case, and the lips aid in sealing between the covering member and the cylinder body. Therefore, even when the axial dimension of the filter containing portion does not match that of the filter, the difference can be canceled by elasticity of the lips.

(32) According to the above-described embodiments, the covering member abutting against the filter is disposed on one axial side of the valve case, and the annular seal member having a larger outer diameter than the inner diameter of the filter is disposed on the other axial side. Therefore, it is possible to hold the filter between the covering member and the annular seal member when the check valve is not yet mounted in the valve chamber, whereby the assembling process can be effectively carried out.

(33) According to the first, second and fourth embodiments, the other filter has a bottomed cylindrical shape, and the open end thereof is fixedly attached to the valve case. Therefore, it is possible to capture foreign materials by a large surface, and thereby possible to reduce resistance when the operating liquid flows through the filter.

(34) According to the first and second embodiments, the other filter is surrounded by the valve case with a space therebetween. Therefore, it is possible to reduce resistance when the operating liquid flows through the filter, and possible to reduce a space occupied by the filter.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-195745, filed on Jul. 27, 2007, Japanese Patent Application No. 2007-200185, filed on Jul. 31, 2007, and Japanese Patent Application No. 2007-200186, filed on Jul. 31, 2007. The entire disclosure of each of Japanese Patent Application No. 2007-195745, filed on Jul. 27, 2007, Japanese Patent Application No. 2007-200185, filed on Jul. 31, 2007, and Japanese Patent Application No. 2007-200186, filed on Jul. 31, 2007 including specification, claims, drawings and summary is incorporated herein by reference in its entirety.

The Japanese Patent Application Public Disclosure No. H11-268629 is incorporated herein by reference in its entirety.

What is claimed is:

1. A master cylinder, comprising:
a cylinder body including a pressure chamber, into which an operating liquid is introduced from a reservoir;
a supply passage for supplying the operating liquid from the reservoir to the pressure chamber;
a piston slidably fitted in the cylinder body to define the pressure chamber, the piston adapted to open or close the supply passage according to a sliding position thereof;
a bypass passage for bypassing the supply passage to connect the reservoir and the pressure chamber, the bypass passage including a check valve adapted to open to allow a flow of the operating liquid from the reservoir to the pressure chamber when a pressure in the pressure chamber is lower than that in the reservoir, the check valve comprising a lift valve in which a valve body is seated on or moves away from a valve seat, the valve body of the lift valve being disposed in a valve case including the valve seat and a guide portion for slidably guiding the valve body which are formed as a single member; and
wherein the valve body includes a sliding portion which slides relative to the guide portion, and a valve portion which is disposed at one side of the sliding portion in a sliding direction and is seated on or moves away from the valve seat;
the valve body is urged toward the valve seat by an urging means;
the sliding portion of the valve body has a circular outer circumference, and a length of the sliding portion in the sliding direction is set to be longer than a diameter of the sliding portion; and
a length of the guide portion in the sliding direction is set to be longer than the length, in the sliding direction, of the sliding portion of the valve body which is guided by the guide portion.

2. The master cylinder according to claim 1, wherein the valve portion of the valve body comprises a valve-portion body formed integrally with the sliding portion, and a rubber valve seal attached to the valve-portion body and adapted to be seated on or move away from the valve seat.

3. The master cylinder according to claim 2, wherein the valve-portion body abuts against the valve seat when the valve seal is compressed in the sliding direction of the valve body by a pressure equal to or larger than a predetermined pressure.

4. A master cylinder, comprising:
a cylinder body which supplies to an outside a pressurized operating liquid generated in a pressure chamber in the cylinder body;
a supply passage formed in the cylinder body for supplying to the pressure chamber the operating liquid reserved in a reservoir;
a bypass passage for bypassing the supply passage to connect the reservoir and the pressure chamber; and
a check valve disposed in the bypass passage and allowing supply of the operating liquid only from the reservoir to the pressure chamber,
wherein the bypass passage includes a valve chamber in which the check valve is disposed, a reservoir passage for connecting the valve chamber and the reservoir, and a pressure-chamber passage for connecting the valve chamber and the pressure chamber;
the check valve is a lift valve in which a valve body is seated on and moves away from a valve seat;
the valve body of the lift valve is slidably disposed in a valve case contained in the valve chamber;
the valve case includes the valve seat which is connected to the reservoir passage and which the valve body is seated on or moves away from, and a guide portion for slidably guiding the valve body, the valve seat and the guide portion being formed as a single member;
the valve case includes a cylindrical portion and a valve seat portion arranged perpendicularly relative to the cylindrical portion;
an inner surface of the cylindrical portion serves as a guide portion; and
the valve seat portion is in communication with the reservoir passage, and a radially extending hole in communication with the pressure-chamber passage is formed through a side wall of the cylindrical portion.

5. The master cylinder according to claim 4, wherein the radially extending hole is positioned in an area of the side wall of the cylindrical portion where the valve body does not slide when the valve body operates.

6. A master cylinder, comprising:
a cylinder body which supplies to an outside a pressurized operating liquid generated in a pressure chamber in the cylinder body;
a supply passage formed in the cylinder body for supplying to the pressure chamber the operating liquid reserved in a reservoir;

a bypass passage for bypassing the supply passage to connect the reservoir and the pressure chamber; and a check valve disposed in the bypass passage and allowing supply of the operating liquid only from the reservoir to the pressure chamber, wherein the bypass passage includes a valve chamber in which the check valve is disposed, a reservoir passage for connecting the valve chamber and the reservoir, and a pressure-chamber passage for connecting the valve chamber and the pressure chamber;

the check valve is a lift valve in which a valve body is seated on and moves away from a valve seat;

the valve body of the lift valve is slidably disposed in a valve case contained in the valve chamber;

the valve case includes the valve seat which is connected to the reservoir passage and which the valve body is seated on or moves away from, and a guide portion for slidably guiding the valve body, the valve seat and the guide portion being formed as a single member; and a sliding portion of the valve body, which is guided by the guide portion, comprises two flanges spaced apart from each other in a sliding direction.

7. The master cylinder according to claim 6, wherein a passage for allowing a flow of the operating liquid is formed at the flange.

8. A master cylinder, comprising:

a cylinder body which supplies to an outside a pressurized operating liquid generated in a pressure chamber in the cylinder body;

a supply passage formed in the cylinder body for supplying to the pressure chamber the operating liquid reserved in a reservoir;

a bypass passage for bypassing the supply passage to connect the reservoir and the pressure chamber; and a check valve disposed in the bypass passage and allowing supply of the operating liquid only from the reservoir to the pressure chamber, wherein the bypass passage includes a valve chamber in which the check valve is disposed, a reservoir passage for connecting the valve chamber and the reservoir, and a pressure-chamber passage for connecting the valve chamber and the pressure chamber;

the check valve is a lift valve in which a valve body is seated on and moves away from a valve seat;

the valve body of the lift valve is slidably disposed in a valve case contained in the valve chamber;

the valve case includes the valve seat which is connected to the reservoir passage and which the valve body is seated on or moves away from, and a guide portion for slidably guiding the valve body, the valve seat and the guide portion being formed as a single member; and the valve case is disposed in the valve chamber so that the valve body moves in a direction of gravity.

9. The master cylinder according to claim 8, wherein:

an upper end of the valve chamber is located at a gravitationally lower position than the reservoir; and the bypass passage connecting the valve chamber and the reservoir is connected to the upper end of the valve chamber.

10. The master cylinder according to claim 8, wherein:

the valve chamber is formed by a recess formed integrally at the cylinder body, the recess opening gravitationally downwardly;

the recess includes an annular stepped portion, and the recess has a reduced diameter portion at a bottom surface side thereof beyond the annular stepped portion, the reduced diameter portion is closed by the valve case; and a pressure-chamber passage of the bypass passage, which connects the valve chamber and the pressure chamber, opens near the annular stepped portion through an inner circumferential surface of the recess, and gravitationally upwardly extends from an opening of the pressure-chamber passage to be connected to the pressure chamber.

11. The master cylinder according to claim 10, wherein:

the valve case comprises a valve seat portion including a valve seat and a communication hole configured to be opened or closed by the valve body moving away from or being seated on the valve seat, and a cylindrical portion gravitationally downwardly extending from the valve seat portion and having an inner surface serving as the guide portion, the valve seat portion and the cylindrical portion being formed as a single member;

a radially extending hole in communication with an inner surface of the cylindrical portion and the pressure-chamber passage is formed through a side wall of the cylindrical portion at a gravitationally lower side relative to an upper end of the opening of the pressure-chamber passage.

12. A master cylinder, comprising:

a cylinder body into which an operating liquid is introduced from a reservoir;

a piston slidably fitted in the cylinder body to define a pressure chamber in the cylinder body;

a supply passage which is formed in the cylinder body and supplies the operating liquid from the reservoir to the pressure chamber;

a bypass passage for bypassing the supply passage to connect the reservoir and the pressure chamber; and a check valve which is disposed in the bypass passage and opens when a pressure in the pressure chamber is lower than that in the reservoir, wherein the bypass passage includes a valve chamber in which the check valve is disposed, and connects the valve chamber to the reservoir and the pressure chamber;

the check valve is a lift valve in which a valve body is seated on or moves away from a valve seat, and the valve body of the lift valve is slidably disposed in a valve case contained in the valve chamber;

the valve case comprises a cylindrical portion, and a valve seat portion including a surface perpendicular to the axis of the cylindrical portion, the cylindrical portion and the valve seat portion being formed as a single member;

the valve seat portion comprises a communication passage connected to the reservoir, and the valve seat comprising the surface which the valve body is seated on or moves away from;

a guide portion for slidably guiding a sliding portion of the valve body is formed on an inner surface of the cylindrical portion;

the valve case is fixed to the cylinder body by a covering member for closing the valve chamber; and a radially extending hole in communication with the pressure chamber is formed through a side wall of the cylindrical portion.

13. The master cylinder according to claim 12, wherein the radially extending hole is positioned in an area on the valve seat side of the guide portion where the sliding portion of the valve body does not slide.

14. The master cylinder according to claim 12, wherein:

a valve portion of the valve body, which is adapted to be seated on and move away from the valve seat, comprises a valve-portion body formed integrally with the sliding portion, and a rubber valve seal attached to the valve-portion body and adapted to be seated on or move away from the valve seat; and the lift valve is urged toward the valve seat by an urging means.

15. The master cylinder according to claim 14, wherein the valve-portion body abuts against the valve seat when the valve seal is compressed in a sliding direction of the valve body by a pressure equal to or larger than a predetermined pressure.

16. The master cylinder according to claim 12, wherein the covering member comprises a covering body for closing an open end of the valve chamber, and a screw member formed as an separate body from the covering body and screwed in the cylinder body.

17. The master cylinder according to claim 12, wherein the valve body is made from a metal material containing aluminum, and is urged toward the valve seat by an urging means.

18. A master cylinder, comprising:
a cylinder body into which an operating liquid is introduced from a reservoir;
a piston slidably fitted in the cylinder body to define a pressure chamber in the cylinder body;
a supply passage which is formed in the cylinder body and supplies the operating liquid from the reservoir to the pressure chamber;
a bypass passage for bypassing the supply passage to connect the reservoir and the pressure chamber; and
a check valve which is disposed in the bypass passage and opens when a pressure in the pressure chamber is lower than that in the reservoir,
wherein the bypass passage includes a valve chamber in which the check valve is disposed, and connects the valve chamber to the reservoir and the pressure chamber;
the check valve is a lift valve in which a valve body is seated on or moves away from a valve seat, and the valve body of the lift valve is slidably disposed in a valve case contained in the valve chamber;
the valve case comprises a cylindrical portion, and a valve seat portion including a surface perpendicular to the axis of the cylindrical portion, the cylindrical portion and the valve seat portion being formed as a single member;
the valve seat portion comprises a communication passage connected to the reservoir, and the valve seat comprising the surface which the valve body is seated on or moves away from;
a guide portion for slidably guiding a sliding portion of the valve body is formed on an inner surface of the cylindrical portion;
the valve case is fixed to the cylinder body by a covering member for closing the valve chamber; and
the sliding portion of the valve body has a circular outer circumference, and a length of the sliding portion in a sliding direction is set to be longer than a diameter of the sliding portion, and the sliding portion comprises two flanges spaced apart from each other in the sliding direction.

19. A master cylinder, comprising:
a cylinder body into which an operating liquid is introduced from a reservoir;
a piston slidably fitted in the cylinder body to define a pressure chamber in the cylinder body;
a supply passage which is formed in the cylinder body and supplies the operating liquid from the reservoir to the pressure chamber;
a bypass passage for bypassing the supply passage to connect the reservoir and the pressure chamber; and
a check valve which is disposed in the bypass passage and opens when a pressure in the pressure chamber is lower than that in the reservoir,
wherein the bypass passage includes a valve chamber in which the check valve is disposed, and connects the valve chamber to the reservoir and the pressure chamber;
the check valve is a lift valve in which a valve body is seated on or moves away from a valve seat, and the valve body of the lift valve is slidably disposed in a valve case contained in the valve chamber;
the valve case comprises a cylindrical portion, and a valve seat portion including a surface perpendicular to the axis of the cylindrical portion, the cylindrical portion and the valve seat portion being formed as a single member;
the valve seat portion comprises a communication passage connected to the reservoir, and the valve seat comprising the surface which the valve body is seated on or moves away from;
a guide portion for slidably guiding a sliding portion of the valve body is formed on an inner surface of the cylindrical portion; and
the valve case is fixed to the cylinder body by a covering member for closing the valve chamber,
wherein filters are respectively disposed at the valve case for preventing entry of a foreign material from an upstream side and a downstream side of the check valve into the check valve.

20. The master cylinder according to claim 19, wherein one of the two filters has a cylindrical shape, and is disposed between the covering member and the cylinder body, around an outer surface of the valve case.

21. The master cylinder according to claim 19, wherein the other of the two filters has a bottomed cylindrical shape, and has an open end fixed to the valve case.

22. The master cylinder according to claim 19, wherein the valve body of the lift valve includes a sliding portion configured to be slidably guided by the guide portion of the valve case; and
aperture sizes of the filters are set to be smaller than a sliding clearance between the sliding portion and the guide portion.

23. A master cylinder, comprising:
a cylinder body including a pressure chamber, into which an operating liquid is introduced from a reservoir;
a supply passage for supplying the operating liquid from the reservoir to the pressure chamber;
a piston slidably fitted in the cylinder body to define the pressure chamber, the piston being adapted to open or close the supply passage according to a sliding position thereof;
a bypass passage for bypassing the supply passage to connect the reservoir and the pressure chamber, the bypass passage including a check valve adapted to open to allow a flow of the operating liquid from the reservoir to the pressure chamber when a pressure in the pressure chamber is lower than that in the reservoir;
wherein filters are respectively disposed at an upstream side and a downstream side of the check valve of the bypass passage for preventing entry of a foreign material into the check valve;
the check valve comprises a lift valve in which a valve body is urged toward the valve seat by an urging means, the valve body including a sliding portion and a valve portion configured to be seated on or move away from the valve seat, and a guide portion configured to slidably guide the sliding portion is disposed in the bypass passage; and aperture sizes of the filters are set to be smaller than a sliding clearance between the sliding portion and the guide portion.

24. The master cylinder according to claim 23, wherein the bypass passage includes a valve chamber in which the check valve is disposed, the valve chamber including a recess formed integrally at the cylinder body and a covering member closing the recess, the filters being contained in the recess of the valve chamber.

* * * * *